(12) United States Patent
Rathjen et al.

(10) Patent No.: US 9,378,604 B1
(45) Date of Patent: Jun. 28, 2016

(54) COIN RECOGNITION SYSTEM AND METHOD

(71) Applicant: Tim E. Rathjen, Bellingham, WA (US)

(72) Inventors: Tim E. Rathjen, Bellingham, WA (US); William H. Lindhardt, Bellingham, WA (US); Charles Alden Foell, III, Bellingham, WA (US); Benjamin Lindhardt, Lynnwood, WA (US)

(73) Assignee: Tim E. Rathjen, Bellingham, WA (US)

( * ) Notice: Subject to any disclaimer, the term of this patent is extended or adjusted under 35 U.S.C. 154(b) by 96 days.

(21) Appl. No.: 14/318,318

(22) Filed: Jun. 27, 2014

Related U.S. Application Data

(60) Provisional application No. 61/840,295, filed on Jun. 27, 2013.

(51) Int. Cl.
| | |
|---|---|
| G06K 9/00 | (2006.01) |
| G07D 3/14 | (2006.01) |
| G07D 5/00 | (2006.01) |
| G06K 9/62 | (2006.01) |

(52) U.S. Cl.
CPC ............... *G07D 3/14* (2013.01); *G06K 9/6267* (2013.01); *G07D 5/005* (2013.01)

(58) Field of Classification Search
None
See application file for complete search history.

(56) References Cited

U.S. PATENT DOCUMENTS

| | | | | | |
|---|---|---|---|---|---|
| 3,187,759 | A * | 6/1965 | Rausing | ................... | G07D 1/00 453/32 |
| 4,558,711 | A * | 12/1985 | Yoshiaki | ................... | G07D 9/00 453/3 |
| 5,135,433 | A * | 8/1992 | Watanabe | ................. | G07D 3/14 194/346 |
| 5,490,588 | A * | 2/1996 | Nishiumi | ................. | G07D 3/14 194/317 |
| 8,162,125 | B1 * | 4/2012 | Csulits | ................. | G07D 7/0033 194/206 |
| 8,929,640 | B1 * | 1/2015 | Mennie | ............. | G06K 9/00469 382/135 |
| 9,141,876 | B1 * | 9/2015 | Jones | ........................ | G06K 9/60 |
| 2002/0162724 | A1 * | 11/2002 | Hino | ........................ | G07D 3/00 194/215 |
| 2008/0205741 | A1 * | 8/2008 | Couronne | .............. | G07D 5/005 382/136 |
| 2009/0303478 | A1 * | 12/2009 | Haddock | .................. | G07D 5/10 356/337 |
| 2013/0202184 | A1 * | 8/2013 | Grove | ...................... | G07D 5/00 382/136 |
| 2014/0335770 | A1 * | 11/2014 | Martin | ..................... | G07D 3/00 453/3 |

FOREIGN PATENT DOCUMENTS

| | | | | | |
|---|---|---|---|---|---|
| FR | 2817376 A1 | * | 5/2002 | ............... | G07D 3/00 |
| JP | 2000242822 A | * | 9/2000 | | |

* cited by examiner

*Primary Examiner* — Wenpeng Chen
(74) *Attorney, Agent, or Firm* — Schwabe, Williamson & Wyatt, P.C.

(57) ABSTRACT

A coin handling system performs a one or two-part coin handling and recognition process. In the first part of the two-part process, the system images bulk coins, determines the coin types or other attributes, and returns at least some of the coins to the bulk coin receptacle; in the second part, the system re-images the coins and uses the coin types or attributes determined in the first part to efficiently and economically perform machine recognition of attributes of the coins. The output is used to handle the coins and to determine a price to pay for the coins. The images are bright field images suitable for use by people.

31 Claims, 17 Drawing Sheets

COIN RECOGNITION SYSTEM AND METHOD

FIELD

This disclosure relates to a method and system for recognizing coins and acting on the product of the recognition.

BACKGROUND

The following description includes information that may be useful in understanding the present invention. It is not an admission that any of the information provided herein is prior art or relevant to the presently claimed invention, or that any publication specifically or implicitly referenced is prior art.

Digital image recognition is known and is utilized to recognize faces in images. Digital image recognition with respect to coins is also known. An example is described in U.S. Pat. No. 8,615,123.

Coin sorting and handling systems are known. Individuals can deposit a large number of coins ("bulk coins") into a sorting and handling system, which system will sort the coins by size, stack and count the sorted coins, and wrap them in sleeves (or place them into a sleeve). Some such systems are known to provide individuals with a receipt, which receipt the individual can redeem for cash. The cash value on such receipts is based on the number of the coins and the coin denomination, less a handling fee, notwithstanding that certain of the coins may have a value greater than the denomination of the coin. Other than some systems which can determine metal types present in coins and provide a value based on the metal type, such systems cannot discriminate a high-value version of a coin (one worth more than the coin's denomination) from a conventional version of a coin (one worth the coin's denomination).

However, performing digital image recognition on bulk coins presents difficulties in terms of the speed at which digital image recognition can be performed relative to an imperative to process bulk coins in a short period of time and relative to the computational cost of performing digital image recognition. In particular, for large unsorted coin collections, discussed herein as "bulk coins," the universe of coin types which need to be searched to perform digital image recognition is very large. For example, there are approximately 200,000 coin types in the Standard Catalog of World Coins (which is not the only or a completely exhaustive catalog of coin types). Template data required for reliable coin type sorting occupies approximately 1 MB of computer memory per coin type. Templates for all coins in the Standard Catalog of World Coins would, for example, require on the order of 200 GB (likely more) of template data to be stored in memory quickly accessible to the computational units (CPU or GPU or otherwise). If processing time for recognition of bulk coins is approximately 100 ms or better, bulk coins may be typed and recognized at a rate of approximately 10 coins per second, or 600 coins per minute. Just the computational resources capable of recognizing 10 different coin types at this pace costs on the order of $1200 to $5000 at the time this paper was prepared.

Machine recognition of a larger set of coin types in one pass through a coin handling system using existing approaches, even when leveraging the great parallel computing power of GPUs, would require a prohibitively expensive computer system, consumption of a large amount of electricity, and a large physical plant just for the computer system, disregarding the machinery required to handle the coins. Moore's Law appears to continue to operate, but the cost of a coin recognition system which can rapidly recognize a large number of different coin types in a single pass or even several such passes will remain prohibitive for most intended users for years to come.

To partially address this issue, existing bulk coin recognition systems process coins by multiple applications of the single-pass operation, one pass for each (very small) subset of coin types which the system can recognize. However, multiple such passes are not desirable because each pass requires that a person physically relocate the coins from the outlet back to the inlet, because each pass causes wear on the coins, because the coin handling machinery needs to be maintained, because the multiple passes multiply the total processing time and decrease the productivity of the system, because it is ignorant of metrics specific to a specific lot of bulk coins, which metrics can be used to greatly enhance true positive identification and classification rates, and because the residual coins in each successive pass become more and more obscure, resulting in passes which return no recognition results. These issues also reduce the extent to which more complex recognition processes can be executed to identify the multitude of coin attributes beyond type which also contribute to the value of a coin, such as year, mint-mark, wear, conditional die varieties, or post-minting marks.

In addition, some known high-volume coin processing systems, such as the one described in U.S. Pat. No. 8,615,123, utilize "dark field" images, wherein the coins are imaged with a light source which is almost parallel to the coin surface. This approach highlights elevation changes in the coin surface, leaving the rest of the image field dark. However, the resulting images are not useful for humans, such as to determine eye appeal for a coin based on the image.

Needed is a reasonably priced, sized, and electrically powered coin recognition system which can recognize a large number of different coin attributes and types, which can determine other, complex coin attributes with only one or two passes, which uses "bright field" images which can also be used by people, and which requires less maintenance and less movement of bins of coins by people.

DETAILED DESCRIPTION

Figure 1A:
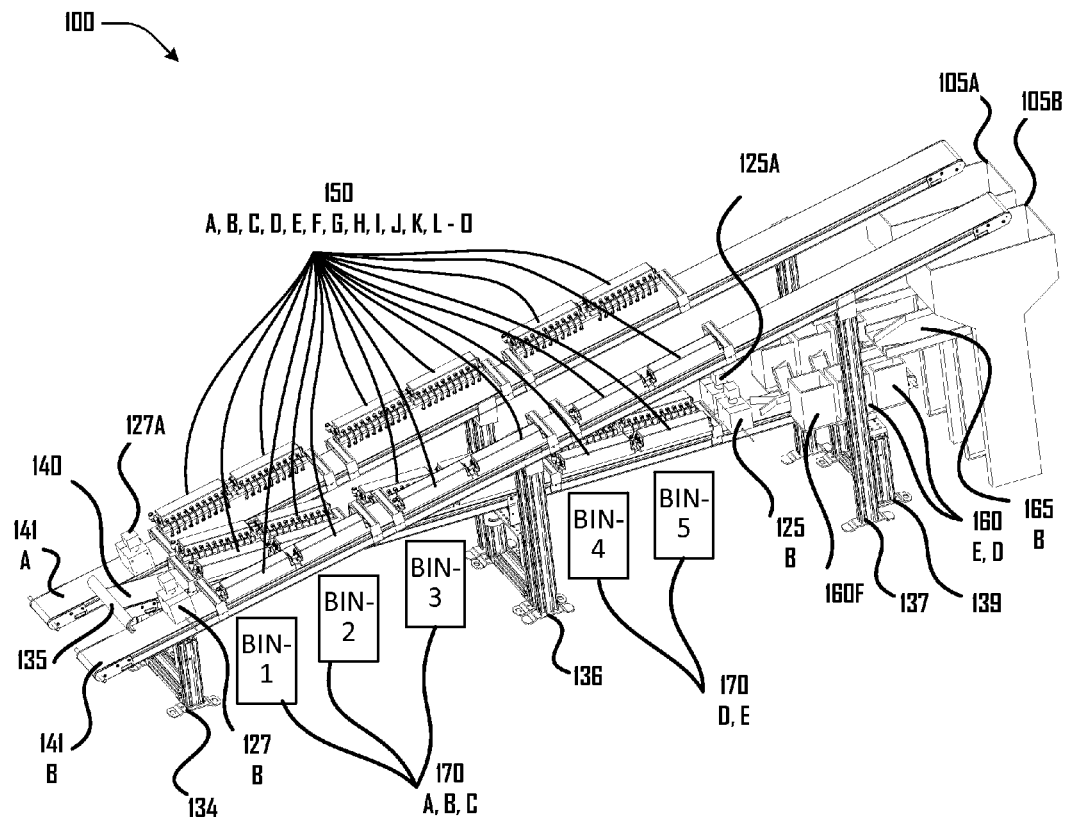
FIG. 1A is a perspective view of Imager-Sorter 100.

The following Detailed Description provides specific details for an understanding of various examples of the technology. One skilled in the art will understand that the technology may be practiced without many of these details. In some instances, structures and functions have not been shown or described in detail or at all to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect between two or more elements; the coupling of connection between the elements can be physical, logical, or a combination thereof. Additionally, the words, "herein," "above," "below," and words of similar import, when used in this application, shall refer to this application as a whole and not to particular portions of this application. When the context permits, words using the singular may also include the plural while words using the plural may also include the singular. The word "or," in reference to a list of two or more items, covers all of the following interpretations of the word: any of the items in the list, all of the items in the list, and any combination of one or more of the items in the list.

Multiple instances of certain components are labeled with an element number and letter; all such component instances are equivalent within normal ranges. Multiple instances of otherwise identical components can control, be controlled, or communicate separately through assignment of unique or distinguishing identifiers. Such components may be referred to herein only by element number, without a letter in conjunction therewith, in which case the reference is to any of such components.

As used herein, a "coin" is a piece of hard material, generally standardized in weight and/or size, and typically used as a medium of exchange or legal tender, often with a stated denomination, such as one cent, five cents, ten cents, etc. Coins are generally minted in one or more metals, plastics, resins, synthetic material, porcelain or other hard material and are produced by governments and private organizations such as, for example, casinos. Coins are herein described as comprising "Attributes," such as, for example, type, strike, surface preservation, luster, mint mark, legend, device, dentils, fields, edge, date, rim, motto, denomination, director's edge mark, engraver's mark, exergue, material, color, finish, die marks, errors, planchet flaws, die varieties, wear and damage (e.g. bent, gouged, spot, scratch, corrosion, hole, jewelry, stain, and mutilated), or any other property, subjective or not, that the user knows or expects would be of collector value (e.g. some specific eye appeal).

In general terms, Recognizer-Controller 300 computer controls or receives information from Imager-Sorter 100 apparatus. The Imager-Sorter 100 receives a set of bulk coins comprising individual coins, such as Coins 1220. Imager-Sorter 100 forms a Circuital Coin Path out of at least the following components: Bulk Coin Hopper(s) 105, Belt 140, Puffer(s) 150, Bin 170, Return Guide 135, Return Belt(s) 141. Circuital Coin Path may be formed by other structures which allow Coins 1220 to be imaged, ejected from Circuital Coin Path into receptacles such as coin tubes, bags, sleeves, bins, or the like, collectively illustrated herein by Bin-1 170A, Bin-2 170B, etc., generally referred to as Bin 170 and, if not ejected, returned to Bulk Coin Hopper 105. Other such structures may comprise, for example, a bulk coin hopper feeding a spiral path with an imager, coin ejectors, bins, and a return mechanism to return coins to the bulk coin hopper. A belt is preferred to reduce wear.

Figure 1B:
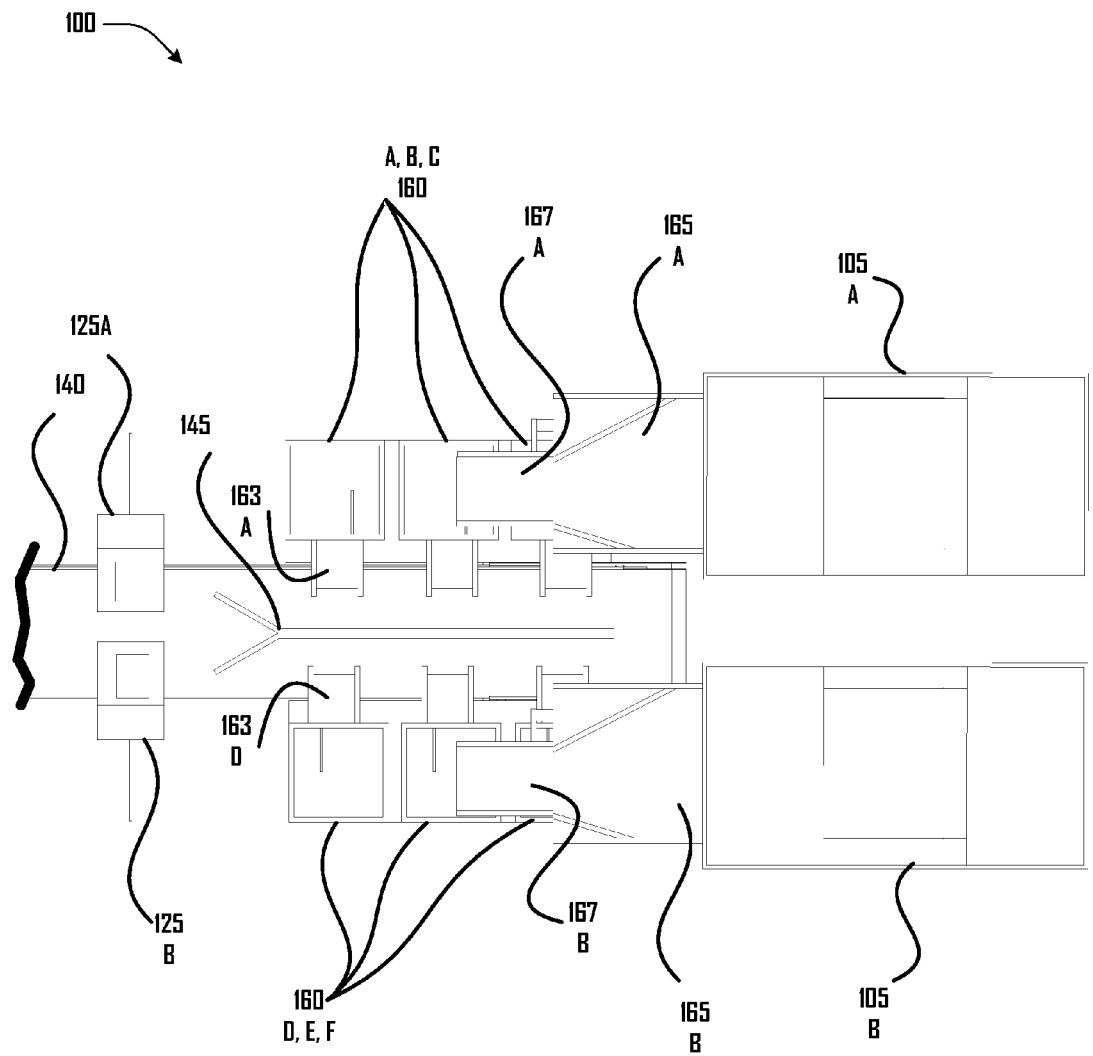
FIG. 1B is a top plan view of Imager-Sorter 100.
Figure 1C:
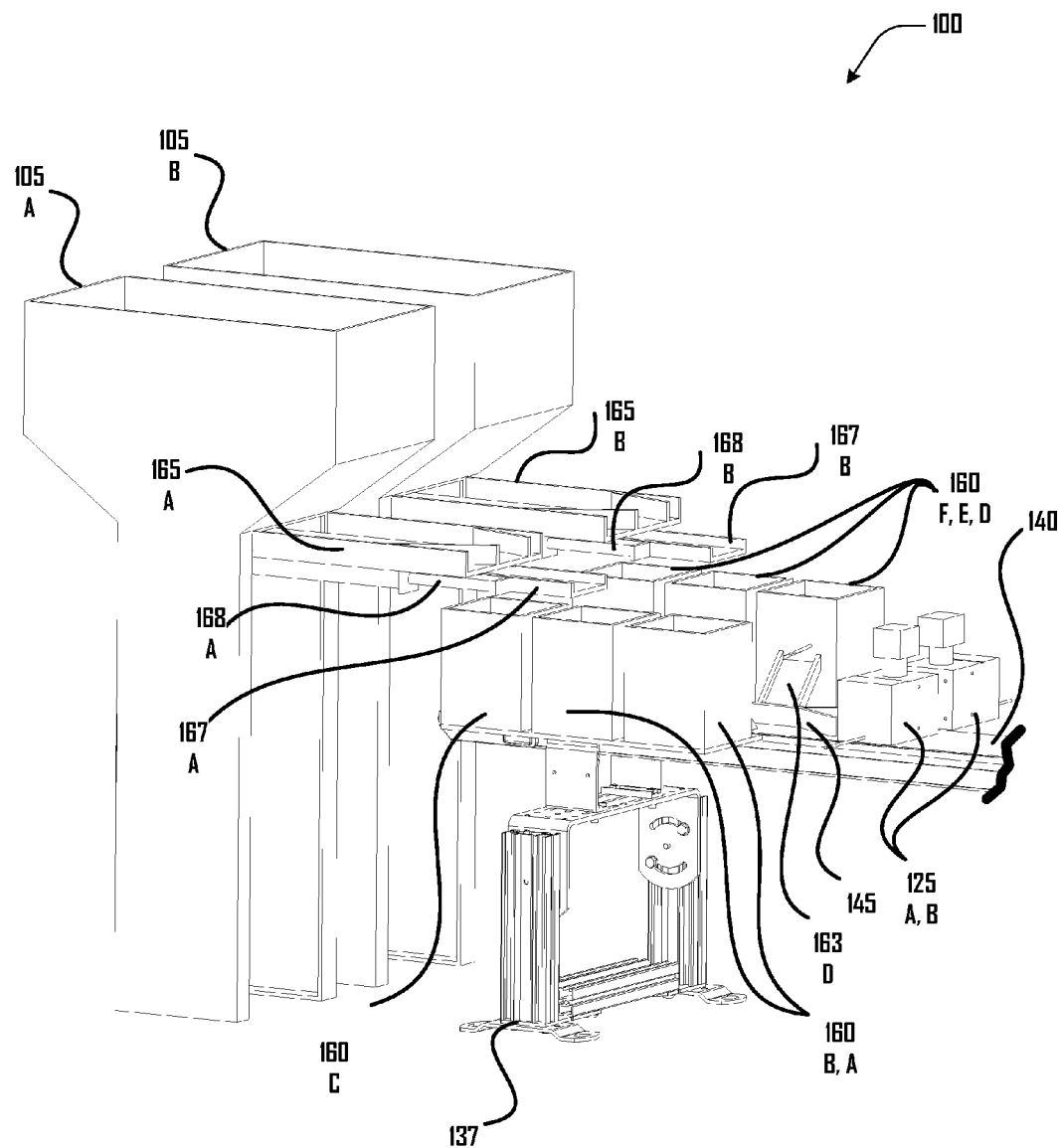
FIG. 1C is a close perspective view of a portion of Imager-Sorter 100.

Bulk Coin Hopper 105 may comprise a vibratory and/or gravity feed and/or a rotating sweeper arm mechanism to feed a stream of coins from Bulk Coin Hopper 105 onto Tray(s) 165. Tray(s) 165 may feed coins via gravity or another force to Singulator 160 via Singulator Selector 167. Singulator Selector 167 may comprise, be connected to, or be controlled by Actuator 168. Actuator 168 may be controlled to cause Singulator Selector 167 to divert the path of coins from, for example, Singulator 160A to Singulator 160B, such as if Singulator 160A becomes clogged, is not suitable for a type of coin, otherwise is or becomes inoperable, or if more than one Singulator 160 is to be used at one time. As illustrated in FIGS. 1A-1C, Actuator 168 may be or comprise a linear motor, a screw, a hydraulic piston, or the like.

Figure 11:
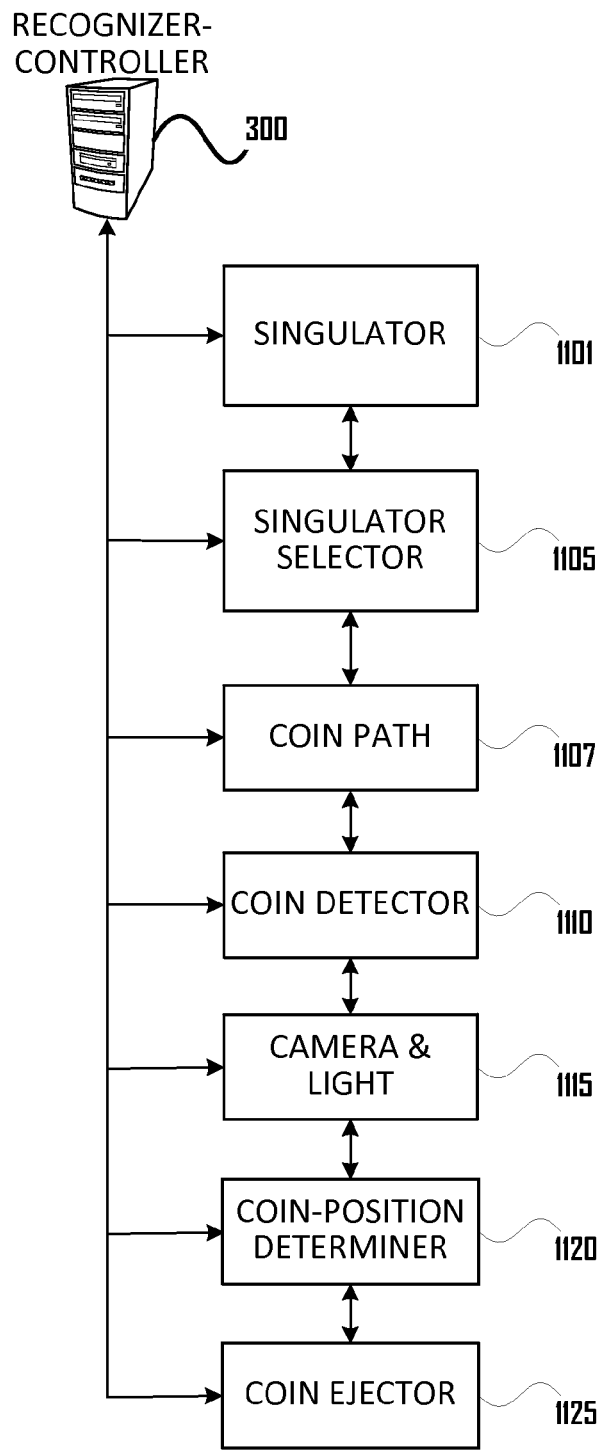
FIG. 11 is a diagram of electrical and communication paths among components of Recognizer-Controller 300.

As illustrated in FIG. 11, the components of Imager-Sorter 100 are in communication with Recognizer-Controller 300 and/or with each other. Sensors in or of Bulk Coin Hopper 105, Tray(s) 165, Singulator 160, Singulator Slide 163, Singulator Selector 167, Rail 145, and Camera Station 125 may provide information to Handling Controller 600 routine, in response to which Handling Controller 600 routine may select Singulator 160B to replace or supplement Singulator 160A. Singulator 160 may comprise a vibratory and/or gravity feed and/or a rotary mechanism to feed coins at a predictable or specifiable rate, one at a time, onto Singulator Slide 163.

Coins exit Singulator Slide 163 at a predictable or specified rate and contact Belt 140. Belt 140 and Return Belt 141 may have a color, such as a green color or another color not typically present in coins. The color may be used to facilitate identification of "coin" and "non-coin" areas in coin images taken of coins on the Belts. Belt 140 and Return Belt 141 may follow a continuous path about rollers, driven by belt motors at a speed determined or monitored by Handling Controller 600. The Belt 140 and Return Belt 141 are labeled in FIG. 11 as Coin Path 1107. The motors, belt speed, position determining sensors, and computer processes required to determine the position of a coin on the Coin Path 1107 are labeled in FIG. 11 as Coin-Position Determiner 1120. The speed of the Belts may be controlled, for example, to specify an optimal speed for a second part of Recognition 500 routine, based on Coin Attributes 430 or Coin Types 407 identified in the first part of Recognition 500 routine.

Coins may be restrained by Rail 145 and fed by Rail 145 to a location on Belt 140 which will pass beneath first Camera Station 125. Rail 145 may have a variable height above the Conveyor Belt 140, which variable height positions coins of different heights (when laying flat) at different locations on Belt 140.

Figure 12:
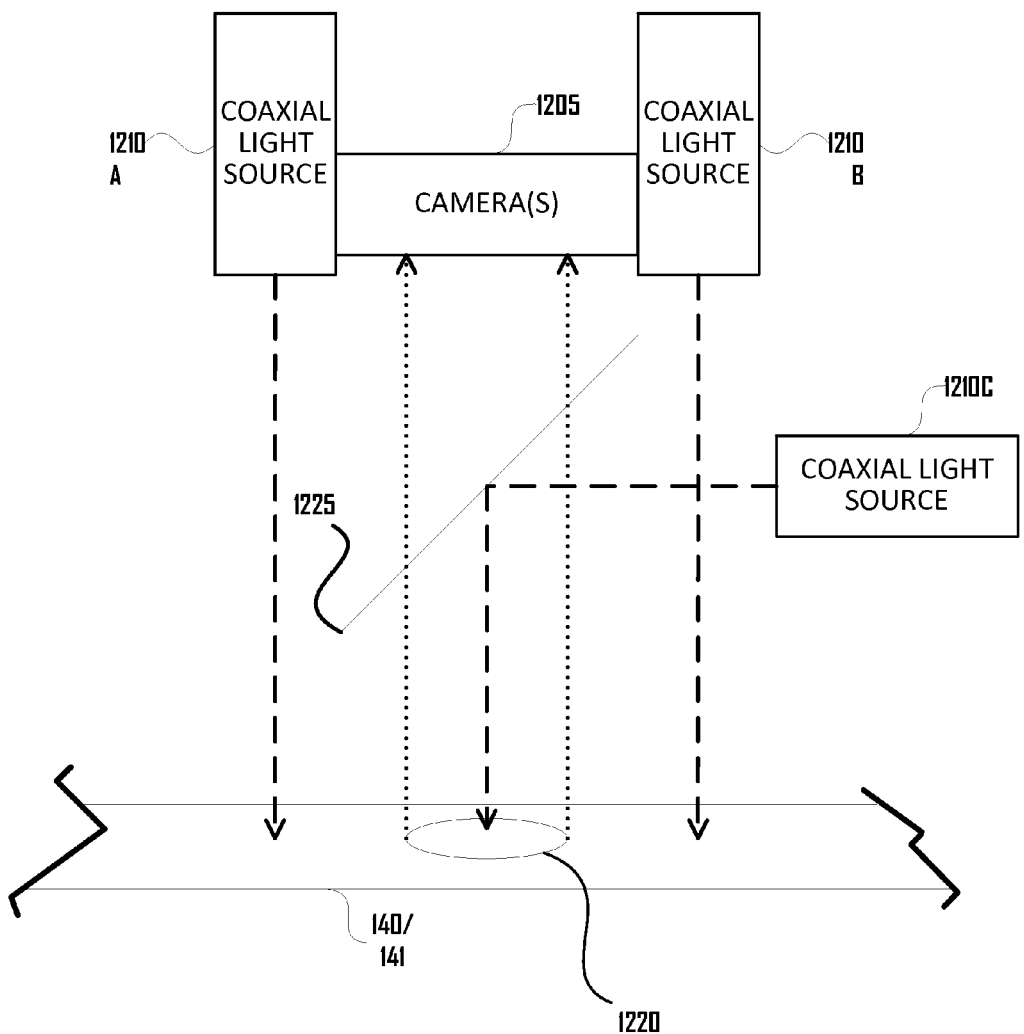
FIG. 12 illustrates components of Camera Station.

Camera Station 125 and 127 are illustrated with greater detail in FIG. 12. As illustrated in FIG. 12, a first side of the coin may be imaged by Camera(s) 1205 in a bright diffuse visible electromagnetic radiation light field, which light field emitted by Coaxial Light Source 1210 is generally coaxial with the sensor normal of Camera(s) 1205 at the coin surface, but diffuse enough to reduce glare. As illustrated in FIG. 12, Coaxial Light Source 1210 may be arranged around Camera(s) 1205, such as at Coaxial Light Source 1210A and 1210B, or may be arranged perpendicular to Camera(s) 1205, with Half-Mirror 1225 reflecting light from Coaxial Light Source 1210C onto Belt 140 or 141 and Coin 1220. Unlike prior dark field imaging approaches, the resulting images may be suitable for use by humans in a human coin grading process. Light sources exhibiting emission characteristics suitable for Coaxial Light Source 1210 are varyingly referred to in industry as, for example, "Diffuse Axial Illuminators," "Diffuse Coaxial Illuminators," "Illumination Axial Diffuselites," or simply "Coaxial lights." All such light sources exhibit on a strong component of light, at the surface of the coin, coaxial with the camera sensor normal, but with adequate diffusivity to reduce glare. Camera Station 125 and 127 may output a digital image of a coin to, for example, Recognizer-Controller Datastore 400, where the digital image may be stored as, for example, Coin Image 425.

Images from Camera(s) 1205 in Camera Station 125 may be processed by Recognizer 500 routine and Handling Controller 600 routine may activate Puffer 150 along Belt 140 to eject a coin from Belt 140 into Bin 170. Puffers 150 may comprise mechanical, electrical, and/or electro-mechanical solenoids, levers, gates, compressed air nozzles, or similar structures capable of removing the coin from Belt 140 (or from a similar structure), generally into a container such as Bin 170.

If not ejected from Belt 140, Circuital Coin Path may comprise Return Guide 135 which may receive coins from end of Belt 140 and may deposit coins on Return Belt 141 with the second side of the coin facing upward, relative to the first side of the coin which faced upward on Belt 140.

The second side of the coin may be imaged by Camera Station 127. Images from Camera(s) 1205 in Camera Station 127 may be processed by Recognizer 500 routine and Handling Controller 600 routine and may activate Puffer 150 along Return Belt 141 to eject a coin from Return Belt 141 into Bin 170. If not ejected from Belt 141, Circuital Coin Path and Return Belt 141 may return the coins to Bulk Coin Hopper 105.

A sheet, plate, cloth, or similar may be inserted or placed on the top of a collection of bulk coins placed in Bulk Coin Hopper 105, such that when coins return to Bulk Coin Hopper 105, the returned coins land on top of the sheet and are segregated from coins which have not already passed through Imager-Sorter 100. Returned coins may also or alternatively be distinguished from coins which have not already passed through Imager-Sorter 100 by Coin ID 420, which Coin ID 420 may comprise an image of Coin 1220, such as Coin Image 425 or the result of a hash or other processing of Coin Image 425, which Coin ID 420 may be used to distinguish coins which have passed through Imager-Sorter 100 from coins which have not.

Imager-Sorter 100 may further comprise components (not shown) to spray, print, or apply one or more dyes or RFID tags onto a coin. A dye may comprise pigments which absorb or reflect electromagnetic radiation of frequencies and may be applied to indicate a code. Imager-Sorter 100 may further comprise components to sort coins by gross characteristics, such as by size (height, radius, edge geometry), weight, and electrical conductivity.

By utilizing a Circuital Coin Path, Imager-Sorter 100 and Recognizer 500 routine may process the coins in a two part Recognizer 500 routine. In a first part of the routine, the coins deposited in the Bulk Coin Hopper 105 may be imaged, the images stored in a high-volume, high-access speed storage, such as High Volume Datastore 255, and with the stored images being processed to identify Coin Types 407 present in the bulk coin deposit. Image processing to identify Coin Types 407 during the first part of the Recognizer 500 routine may be executed post-handling (which may be off-line or non-realtime), or may be executed while-handling, up to the limit of available computing resources. During the first part of Recognizer 500 routine, a subset of Recognition Criteria 405 may be applied to the coins within available computing resources, such as to identify a subset of Coin Types 407, such as very common coins or very valuable coins or a Coin Type 407 believed to be in the set of bulk coins. The coins identified in the first part of Recognizer 500 routine may be "binned" (ejected into a Bin).

Following the first part of the Recognizer 500 routine, identified Coin Types 407 are loaded as a smaller set of Coin Type 407 criteria into the computing resources used by Recognizer 500 routine. The coins in the Bulk Coin Hopper 105 may then be processed by the Recognizer 500 routine using the smaller set of Coin Type 407 criteria. The smaller set of Coin Type 407 criteria significantly improves the computer processing time and makes it tractable to perform OCR and OIR to determine Coin Attributes 430 and to determine a Coin Value 435.

Following the second step of the Recognizer 500 routine, Handling Controller 600 routine may direct Imager-Sorter 100 to eject the coins into different Bins 170 for further handling; ejection of the coins into Bins 170 may be based on the Attributes and/or a numismatic Coin Value 435 assigned to the coins by Recognizer 500 routine. A numismatic value is a value based on the study and collection of coins, which numismatic value may be in excess of (or at least different than) the monetary value conferred by law or by the credit-value of the coin (such as a coin with a credit-value of one cent but which is worth ten dollars because it has a rare error and is valued more by collectors).

Payment Determiner 700 determines a price to offer to the user for individual coins or for the set of bulk coins deposited into Imager-Sorter 100, which price is based on the Attributes and/or numismatic Coin Value 435 determined by Recognizer 500 routine.

Price Change Notifier 800 routine may update parties or information stores associated with parties if the Coin Value 435 of a coin identified by Recognizer 500 routine has changed.

Image Classification 900 routine processes coin images to update Benchmark Images 410 used by the Recognizer 500 routine and to identify coins with Attributes which have not previously been categorized and/or valued.

Machine Learning 1000 routine may provide feedback based on a coin assessment provided by a human, Human Coin Assessment 450, to a machine learning algorithm. "Assessment" may be, for example, of any already exemplified attribute, or any other human measure of the coin image, subjective or not. Machine learning algorithm may be used by Recognizer 500 or Machine Learning Routine 1000.

Figure 2:
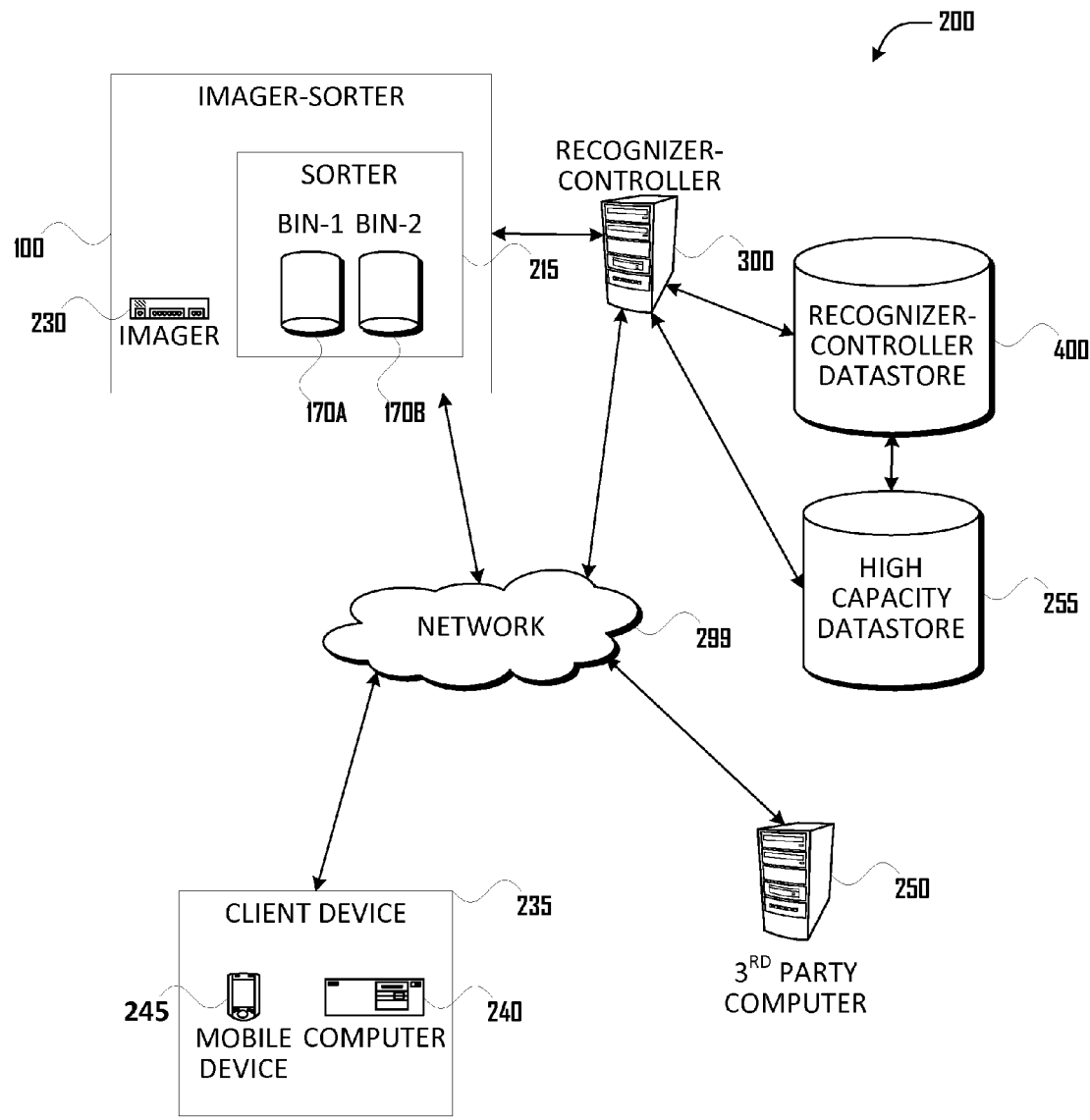
FIG. 2 is a network and device diagram illustrating exemplary computing devices configured according to embodiments disclosed in this paper.

FIG. 2 is a network and device diagram illustrating exemplary computing devices configured according to embodiments disclosed in this paper. Illustrated is Imager-Sorter 100, illustrated in schematic form as comprising Imager 230, which may comprise Camera Station 125 and/or 127. Imager-Sorter 100 is also illustrated as comprising Sorter 215, and, within Sorter 215, Bin-1 170A and Bin-2 170B (collectively referred to as "Bin 170" or "Bins 170"). Sorter 215 may also comprise coin handling equipment such as Bulk Coin Hopper 105, Singulators 160, Singulator Selectors 167, Belt 140, Return Belt 141, Puffers 150, sensors attached to these components, and other coin handling equipment. The Imager-Sorter 100 is illustrated as connecting to the Network 299 and/or as connecting directly to the Imager-Sorter 100.

The Network 299 illustrated in FIG. 2 comprises computers, network connections among the computers, and software routines to enable communication between the computers over the network connections. Examples of the Network 299 comprise an Ethernet network, the Internet, and/or a wireless network, such as a GSM, TDMA, CDMA, EDGE, HSPA, LTE, LTE-Advanced or other network provided by a wireless service provider. Connection to the Network 299 may be via a wireless or wireline connection. More than one network may be involved in a communication session between the illustrated devices. Connection to the Network 299 may require that the computers execute software routines which enable, for example, the seven layers of the OSI model of computer networking or equivalent in a wireless phone network.

Imager 230 may comprise the components necessary to digitally image a coin, such as Camera Station 125 and 127. As discussed, Camera Station 125 and 127 may comprise Camera(s) 1205 and Coaxial Light Source(s) 1210.

Also illustrated in FIG. 2 is a Recognizer-Controller 300 computer, which Recognizer-Controller 300 receives digital images of coins from the Imager-Sorter 100, may use Recognizer 500 and Handling Controller 600 to recognize coins and to control Imager-Sorter 100 to sort the coins into Bins 170. Recognizer-Controller 300 may comprise or be connected to Recognizer-Controller Datastore 400 (discussed further below) and/or High Capacity Datastore 255. High Capacity Datastore 255 may be a component of Recognizer-Controller Datastore 400, though is illustrated separately for the sake of clarity. High Capacity Datastore 255 may comprise a high-volume, high-speed data store, as may be provided by, for example, a hybrid or solid-state drive containing flash-based, DRAM-based, or the like, potentially in conjunction with a hard disk drive. References herein to Recognizer-Controller Datastore 400 should be understood to refer to Recognizer-Controller Datastore 400 and/or to High Capacity Datastore 255 as a component of Recognizer-Controller Datastore 400.

Also illustrated in FIG. 2 is Third Party Computer 250. Third Party Computer 250 represents various computers and equipment such as, for example, equipment and/or computer coupled to the Imager-Sorter 100, which Third Party Computer 250 may act as a proxy for the Recognizer-Controller 300, be under the control of the Recognizer-Controller 300, subscribe to services of the Recognizer-Controller 300, and/or executing routines under the control of or with the permission of Recognizer-Controller 300. Third Party Computer 250 is illustrated as connecting to the Network 299; Third Party Computer 250 may also comprise a direct connection to Imager-Sorter 100.

Also illustrated in FIG. 2 is Client Device 235; illustrated within Client Device 235 are examples of Client Device 235, such as Computer 240 (which may be a laptop, desktop, tower computer and similar) and Mobile Device 245 (which may be a smart phone, mobile phone, tablet computer, wearable computer, and similar). Client Device 235 illustrates computers and/or equipment which users may utilize to interact with the Recognizer-Controller 300, Imager-Sorter 100, and/or Third Party Computer 250.

This paper may discuss a first computer or computer process as connecting to a second computer or computer process (such as the Imager-Sorter 100, the Third Party Computer 250 and/or Client Device connecting to the Recognizer-Controller 300 or to each other) or to a corresponding datastore (such as to Recognizer-Controller Datastore 400); it should be understood that such connections may be to, through, or via the other of the two components (for example, a statement that Imager-Sorter 100 connects with or sends data to the Recognizer-Controller 300 should be understood as saying that the computing device may connect with or send data to the Recognizer-Controller Datastore 400). References herein to "database" should be understood as equivalent to "Datastore." Although illustrated as components integrated in one physical unit, the computers and databases may be provided by common (or separate) physical hardware and common (or separate) logic processors and memory components. Though discussed as occurring within one computing device, the software routines and data groups used by the software routines may be stored and/or executed remotely relative to any of the computers through, for example, application virtualization.

Figure 3:
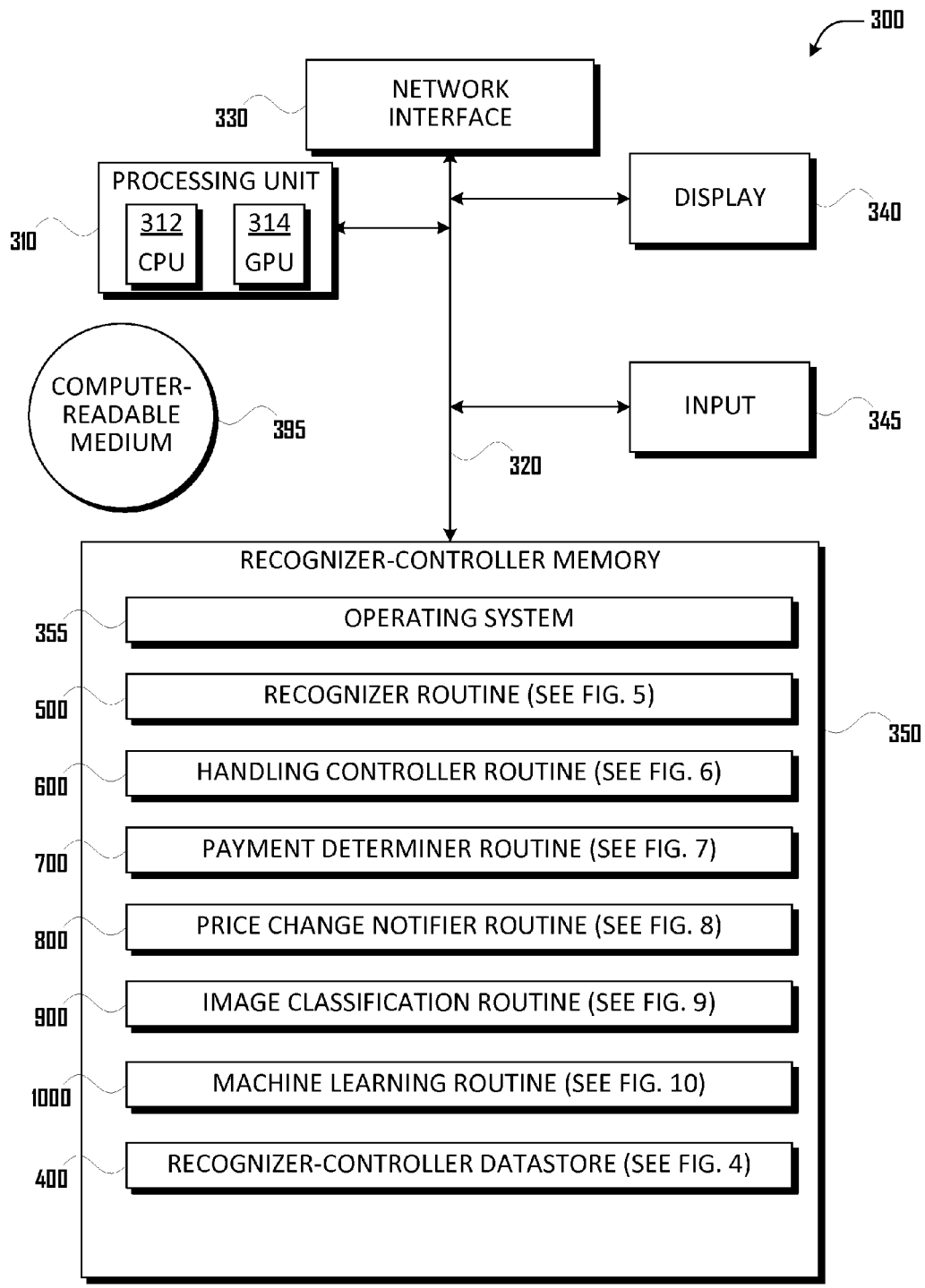
FIG. 3 is a functional block diagram of an exemplary Recognizer-Controller 300 computing device and some data structures and/or components thereof.

FIG. 3 is a functional block diagram of an exemplary Recognizer-Controller 300 computing device and some data structures and/or components thereof. Recognizer-Controller 300 in FIG. 3 comprises at least one Processing Unit 310, Recognizer-Controller Memory 350, Display 340 and Input 345, all interconnected along with Network Interface 330 via Bus 320. Processing Unit 310 may comprise one or more general-purpose Central Processing Units ("CPU") 312 as well as one or more special-purpose Graphics Processing Units ("GPU") 314. CPU 312 and GPU 314 may be used by, for example, OpenCV (short for "Open Source Computer Vision") and CUDA ("Compute Unified Device Architecture"). OpenCV is an example of a library of programming functions which utilize performance primitives provided by a computer processor manufacturer to perform real-time computer vision processing more rapidly or using lower-cost components. CUDA is a parallel computer platform and programming model which utilizes multiple GPUs 314 in a parallel architecture to perform graphics or general purpose processes. Utilization of OpenCV and CUDA or the like may allow Recognizer 500 and other of the routines disclosed herein to be executed more quickly and/or at lower cost, such as using multiple GPUs 314. OpenCV and/or CUDA may be a part of Operating System 355 and/or of other routines in Recognizer-Controller Memory 350.

By utilizing a cross-platform foundation based on OpenCV and CUDA or the like, the disclosed methods may be executed in software on dedicated computers as well as Windows, iOS, Android, and Linux devices with compatible hardware. This enables use of a wide range of computing devices, including laptops, desktops, smart phones, tablets and servers running a range of compatible operating systems with a connection to Imager-Sorter 100 or components thereof.

The components of Processing Unit 310 may be utilized by Operating System 355 for different functions required by routines executed by Recognizer-Controller 300. Network Interface 330 may be utilized to form connections with Network 299 or to form device-to-device connections with other computers. Recognizer-Controller Memory 350 generally comprises a random access memory ("RAM"), a read only memory ("ROM"), and a permanent mass storage device, such as a disk drive or SDRAM (synchronous dynamic random-access memory). Recognizer-Controller Memory 350 stores program code for software routines, such as, for example, Recognizer 500 routine, Handling Controller 600 routine, Payment Determiner 700 routine, Price Change Notifier 800 routine, Image Classification 900 routine, and Machine Learning 1000 routine, as well as, for example, browser, email client and server routines, client applications, and database applications (discussed further below). Additional data groups for routines, such as for a webserver and web browser, may also be present on and executed by the Recognizer-Controller 300. Webserver and browser routines may provide an interface for interacting with the other computing devices illustrated in FIG. 3 or with other computing devices not illustrated in FIG. 3, for example, through webserver and web browser routines (which may serve and respond to data and information in the form of webpages and html documents or files). The browsers and webservers are meant to illustrate user- and machine-interface routines generally, and may be replaced by equivalent routines for serving and rendering information to and in an interface in a computing device (whether in a web browser or in, for example, a mobile device application, or an API call to a server, a library, or the like).

In addition, Recognizer-Controller Memory 350 also stores Operating System 355. These software components may be loaded from a non-transient Computer Readable Storage Medium 395 into Recognizer-Controller Memory 350 of the computing device using a drive mechanism (not shown) associated with a non-transient Computer Readable Storage Medium 395, such as a floppy disc, tape, DVD/CD-ROM drive, memory card, or other like storage medium. In some embodiments, software components may also or instead be loaded via a mechanism other than a drive mechanism and Computer Readable Storage Medium 395 (e.g., via Network Interface 330).

The Recognizer-Controller 300 may also comprise hardware supporting input modalities, Input 345, such as, for example, a touchscreen, a camera, including Camera(s) 1205, a keyboard, a mouse, a trackball, a stylus, motion detectors, and a microphone. Input 345 may also serve as Display 340, as in the case of a touchscreen display which also serves as Input 345, and which may respond to input in the form of contact by a finger or stylus with the surface of Input 345. Input 345 and Display 340 may physically be part of Recognizer-Controller 300 and/or may be a component(s) of another device, such as of Imager-Sorter 100.

Figure 4:
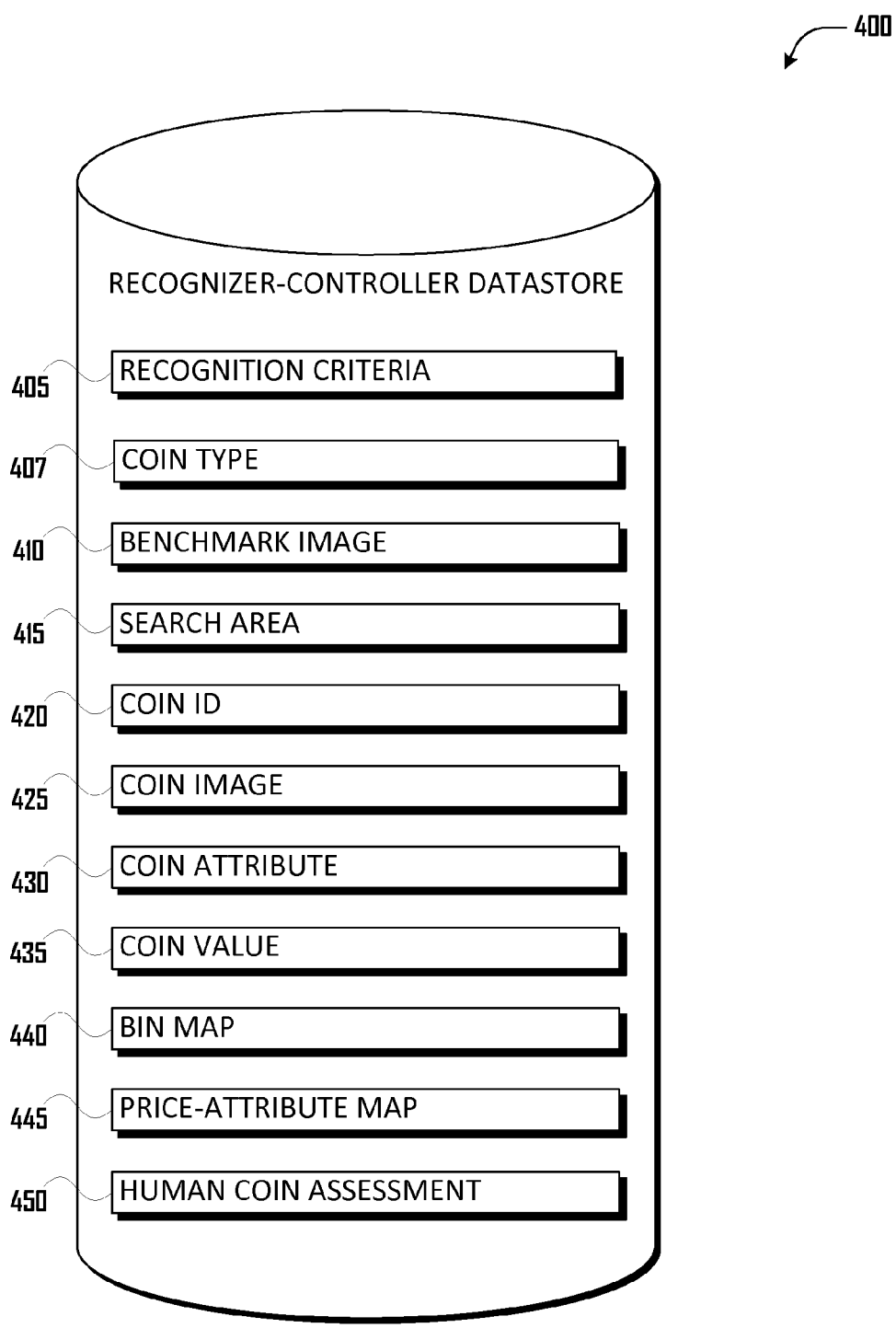
FIG. 4 is a functional block diagram of Recognizer-Controller Datastore 400.

The Recognizer-Controller 300 may also comprise or communicate via Bus 320 with Recognizer-Controller Datastore 400 (which, as noted, may comprise High Capacity Datastore 255), illustrated further in FIG. 4. In various embodiments, Bus 320 may comprise a storage area network ("SAN"), a high speed serial bus, and/or via other suitable communication technology. In some embodiments, the Recognizer-Controller 300 may communicate with the Recognizer-Controller Datastore 400 via Network Interface 330. The Recognizer-Controller 300 may, in some embodiments, include many more components than those shown in this Figure. However, it is not necessary that all of these generally conventional components be shown in order to disclose an illustrative embodiment.

FIG. 4 is a functional block diagram of Recognizer-Controller Datastore 400. The illustrated components of the Recognizer-Controller Datastore 400 are data groups used by routines and are discussed further herein in the discussion of other of the Figures.

The data groups used by routines illustrated in FIG. 4 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar.

Recognition Criteria 405 may comprise values of pixels or values of groups of pixels, which values may be independent of a Benchmark Image 410 or which may depend upon a Benchmark Image 410. Recognition Criteria 405 independent of a Benchmark Image 410 (also referred to herein as "template-independent data" or "template-independent criteria") may comprise, for example, a diameter of a group of pixels, a color of a pixel or a group of pixels, a luminance, a contrast ratio, a reflectance, or the like. Recognition Criteria 405 dependent on a Benchmark Image 410 may comprise, for example, the top of a forehead to a chin, the tip of a nose to the back of an eye, a chin, lettering in a specific area, a pattern of lines, curves, and the like. When found in a source Coin Image 425, Recognition Criteria 405 identify or exclude a match with a Benchmark Image 410 (as determined by result of the Recognizer 500 routine) or identify or exclude a match with Recognition Criteria 405 independent of a Benchmark Image 410 (as discussed above). Recognition Criteria 405 may be derived from existing databases, from Benchmark Image 410, may be obtained from users who train a computer learning process to recognize a set of criteria or who input template-independent criteria, or from automated machine learning processes which receive feedback, as illustrated in relation to FIG. 10 and Machine Learning Routine 1000.

Coin Type 407 may comprise a type of coin, such as a penny, nickel, quarter, or the like, associated with a set of Recognition Criteria 405. Coin Type 407 may comprise narrower types within a broader type, such as a narrower "Wheat Cent" Coin Type 407, within the broader "US Penny" Coin Type 407.

Benchmark Image 410 may comprise entries for pixels or pixel relationships of or in a representative coin image, which representative coin image may be a particular coin image or an average or mean values derived from more than one coin image.

Search Area 415 records may comprise entries indicating the size and location of a search area (which may be rectangular or another shape or set of shapes), which search area may be subject to OCR and/or OIR as part of Recognizer 500 routine. Generally, Search Area 415 is defined relative to a Benchmark Image 410 and/or relative to the center of a coin. Search Area 415 may comprise areas of interest in a coin, which areas of interest comprise Attributes, such as a year, a mint-mark, or another Attribute.

Coin ID 420 records may comprise entries to identify a specific coin passing or passed through the Imager-Sorter 100. Coin ID 420 records may be associated with other records, such as Coin Attribute 530, Bin Map 440, Coin Value 435, Coin Image 425, and Human Coin Assessment 450 records. Coin ID 420 may be used by, for example, Handling Controller 600 routine to eject a coin at a particular location on a Belt. Coin ID 420 records may be an arbitrary number or character string and/or may comprise a digital image or result of processing of a digital image of the coin assigned a particular Coin ID 420.

Coin Image 425 records may comprise entries for a digital image of a coin.

Coin Attribute 430 records may comprise entries indicating Attributes of coins and, where applicable, ranges of values for Attributes. Coin Attribute 430 records may comprise a table (or similar datastructure) describing Attributes and value of Attributes which a coin may have, such as, for example, type, strike, surface preservation, luster, mint mark, legend, device, dentils, fields, edge, date, rim, motto, denomination, director's edge mark, engraver's mark, exergue, material, color, finish, damage (e.g. bent, gouged, spot, scratch, corrosion, hole, jewelry, stain, and mutilated), or any other property, subjective or not, that the user knows or expects would be of collectible value (e.g. some specific eye appeal). A Coin ID 420 record may be associated with a subset of Coin Attribute 430 records to record Attributes measured with respect to a coin and its Coin ID 420 record.

Coin Value 435 records may comprise entries indicating the value of a coin; the Coin Value 435 records may be associated with Coin Attribute 430 records associated with a Coin ID 420.

Bin Map 440 records may comprise entries indicating a Bin 170 into which a coin is to be or was ejected into. Bin Map 440 records may be associated with contact or location information for a Bin and other characteristics, such as whether the Bin holds more than one coin, whether the Bin is a roll of coins, a bar code, RFID, QR code, or similar identifier on or associated with a Bin or a collection of coins.

Figure 5A:
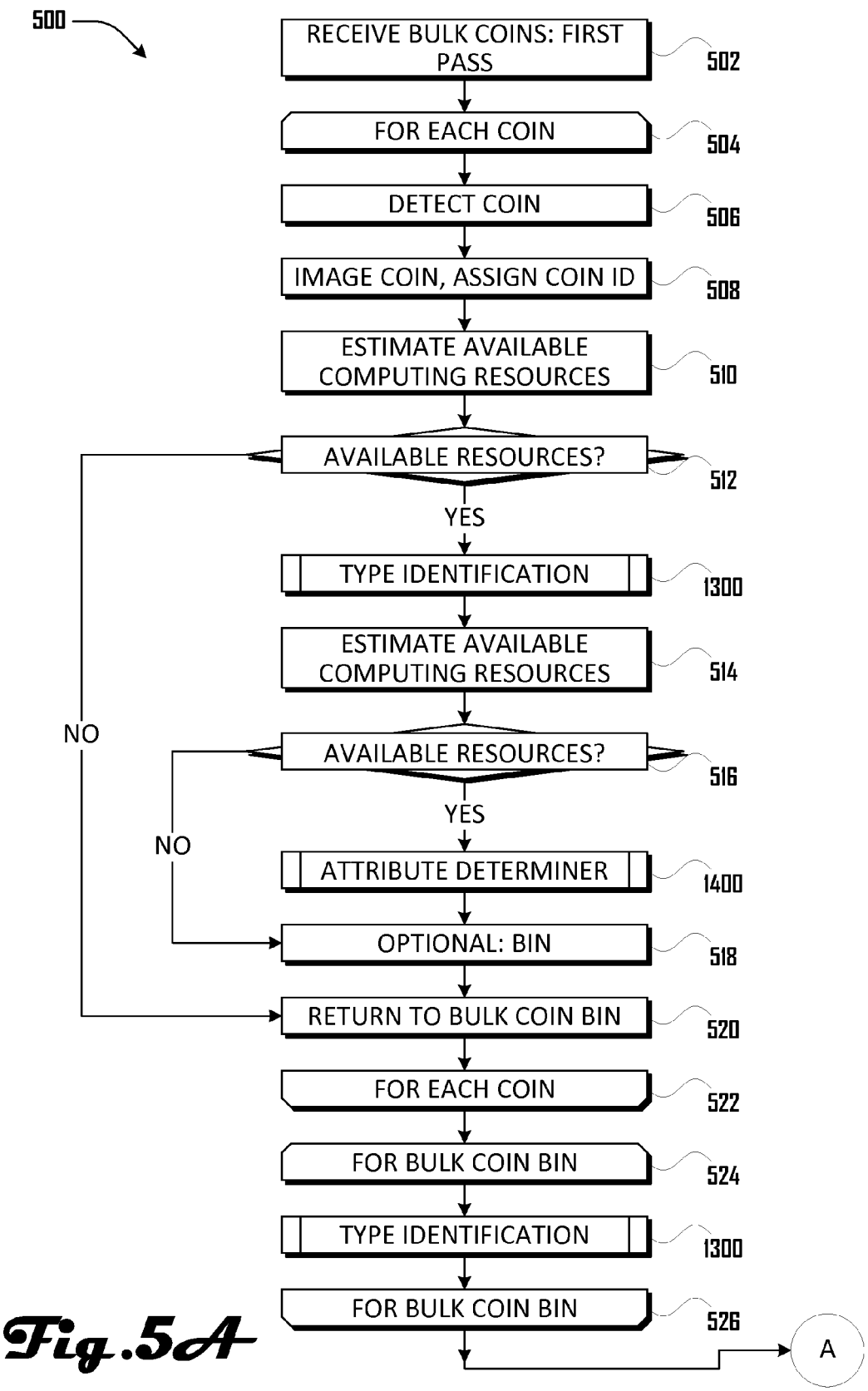
FIGS. 5A and 5B are a flowchart illustrating Recognizer 500 routine.
Figure 5B:
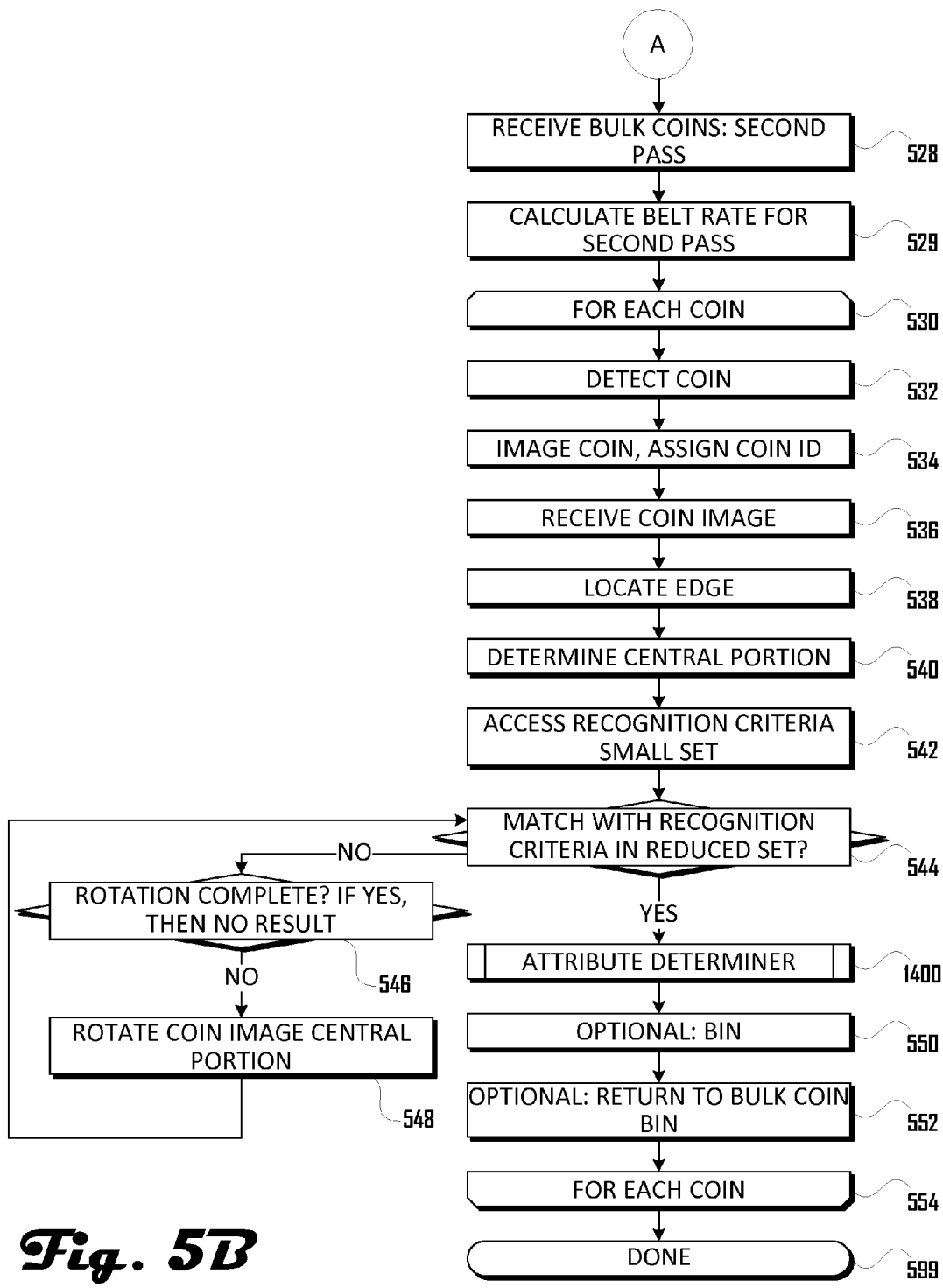

FIGS. 5A and 5B are a flowchart illustrating Recognizer 500 routine. At block 502, a set of bulk coins are received. Blocks 504 through 522 are performed iteratively for each coin in the set of bulk coins. The bulk coins proceeding through the Imager-Sorter 100 may be heterogeneous (not all of the same gross type).

At block 506, a coin is detected as entering the active portion of the Circuital Coin Path, e.g. passing from Singulator 160 to Belt 140. At block 508, the coin may be imaged, such as by activation of Camera Station 125, which image may be saved as Coin Image 425. If not performed already, the coin may be assigned a Coin ID 420 which, as noted, may be Coin Image 425 or the result of a process executed on Coin Image 425.

At block 510, Recognizer 500 routine estimates computing resources (CPU and/or GPU threads, memory, and/or memory bandwidth), available for use by Recognizer 500 routine relative to, for example, Type Identification 1300 subroutine. At block 512, if computing resources are available, then Recognizer 500 routine may perform Type Identification 1300 subroutine on the coin.

Figure 13:
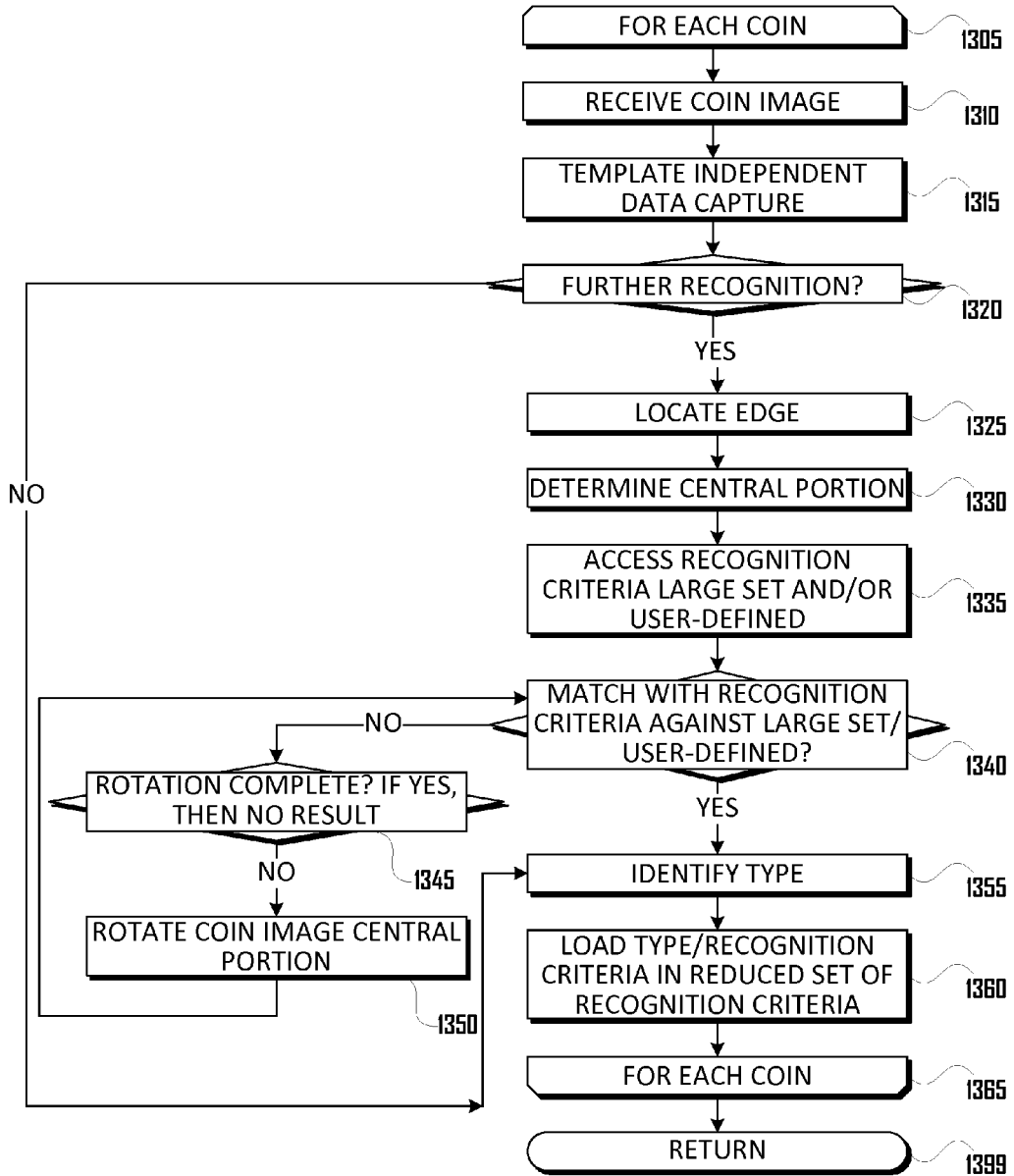
FIG. 13 is a flowchart illustrating a Type Identification subroutine.

Referring to FIG. 13, blocks 1305 through 1365 are performed for each coin which is then being processed by the Type Identification 1300 subroutine. At block 1310, Type Identification 1300 subroutine receives Coin Image 425. At block 1315, which may, as with other blocks, be optional, a subset of Recognition Criteria 405 not dependent on a Benchmark Image 410 (template-independent data) may be extracted from Coin Image 425. As noted elsewhere, template-independent data may comprise, for example, a diameter, pixel intensity variance, a reflectance, a color, and the like. At block 1320 a determination may be made regarding whether further recognition is to be performed, such as based on Recognition Criteria 405 dependent on a Benchmark Image 410; if not, then Type Identification 1300 subroutine may proceed to block 1355.

If affirmative at block 1320, then at block 1325, Type Identification 1300 subroutine may locate an edge of a coin in Coin Image 425. At block 1330, a central portion, such as a central diameter, of the coin in the Coin Image 425 is determined, based on, for example, a longest transect across Coin Image 425 or according to the median values of estimators of horizontal and vertical coin center coordinate components, equal to bisectors of vertical and horizontal lines whose endpoints coincide with coin edges as determined by local extremization of pixel intensity step functions.

At block 1335, a complete or very large set of Recognition Criteria 405 (which may comprise user-specified Recognition Criteria 405) are accessed.

At block 1340, the Recognition Criteria 405 of block 1335 are applied to Coin Image 425, for example, to match Coin Image 425 to a Benchmark Image 410 record or to match Coin Image 425 to template-independent criteria (not already obtained at block 1315). Block 1340 may proceed by taking the central portion of Coin Image 425 from Block 1330, and match it to Recognition Criteria 405, such as, for example, by overlaying Coin Image 425 pixels on Recognition Criteria 405 pixels and subtracting (and potentially squaring) the values; if the result is not zero or not close to zero, then no match is determined. Alternative matching algorithms may be followed, such as algorithms which involve pixel addition or algorithms which involve determining a hash of Coin Image 425 across a matrix of pixel values which matrix has an orientation and comparing the hash value to a corresponding hash value of Recognition Criteria 405 (or of Benchmark Image 410).

If no match is determined at block 1340, and if at block 1345 a full set of rotations has not yet been completed (in which case, an error or a "no result" message may be returned and the coin ejected at an associated Bin 170), then at block 1350 the central portion of Coin Image 425 from block 1330 may be rotated (or the pixel values in the matrix are rotated), such as, for example, by one degree. The process may then return to block 1340 to determine if a match is found. If at block 1345 a full set of rotation has been completed and "no result" is returned, then the lack of a result may be identified as a Coin Type 407, such as an "unknown" Coin Type 407.

At block 1355, if a match is found at block 1340 or proceeding from block 1320, a Coin Type 407 may be obtained, which Coin Type 407 is associated with Recognition Criteria 405 and/or Benchmark Image 410 records. At block 1360, Coin Type 407, Benchmark Image 410, and/or Recognition Criteria 405 records may be associated with Coin ID 420 and/or loaded in a reduced set of Recognition Criteria 405 to be used in the second pass of Recognizer 500, blocks 528 to 554.

At block 1399 Type Identification 1300 subroutine may return.

In FIG. 5A at block 514, Recognizer 500 routine may estimate whether computing resources (CPU and/or GPU threads, memory, and/or memory bandwidth), are available for use by Recognizer 500 routine relative to, for example, Attribute Determiner 1400 subroutine. At block 1400, if computing resources are available, then Recognizer 500 routine may perform Attribute Determiner 1400 subroutine on the coin.

Figure 14:
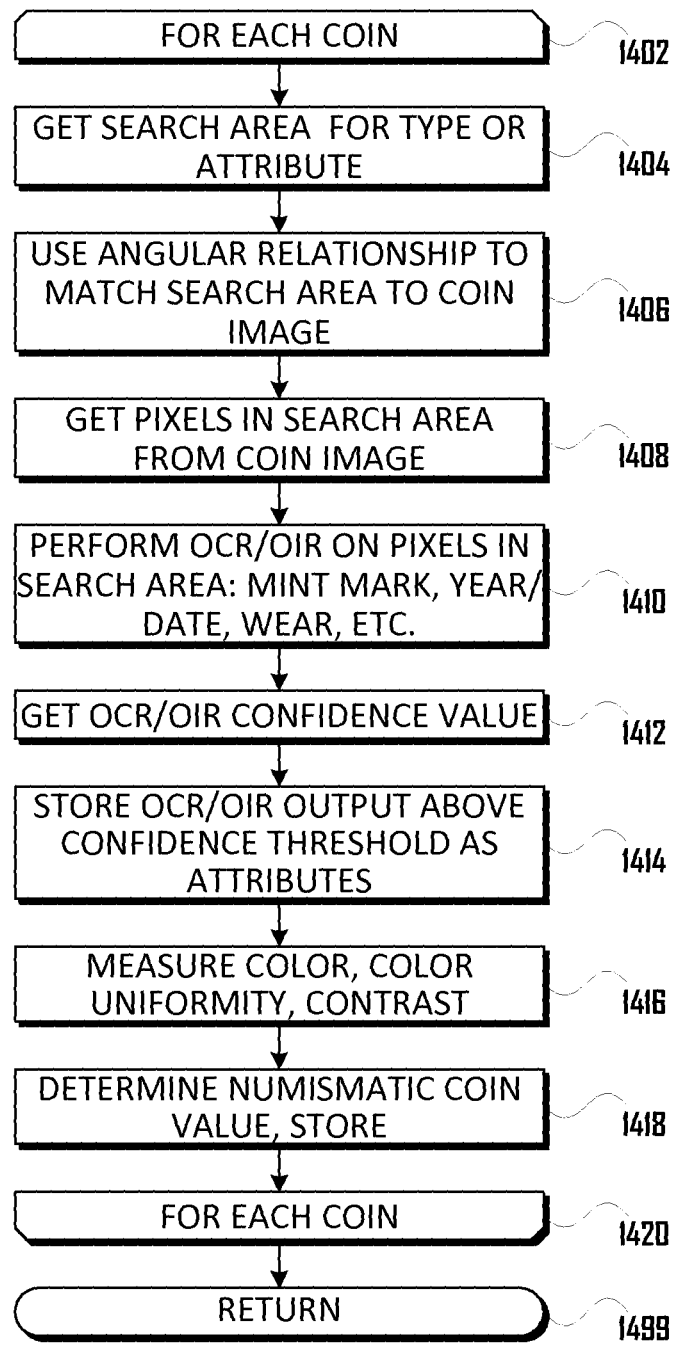
FIG. 14 is a flowchart illustrating an Attribute Determiner subroutine.

Referring to FIG. 14, blocks 1402 through 1420 are performed for each coin which is then being processed by the Attribute Determiner 1400 subroutine.

At block 1404 a Search Area 415 for the Coin Type 407 may be obtained. At block 1406, the angular relationship between the Coin Image 425 and the Benchmark Image 410, determined through, for example, performance of blocks 1345*a* and 1350*a*, is used to match the Search Area 415 to the Coin Image 425 with the proper angular relationship.

At block 1408, the pixels in the Search Area 415 in the Coin Image 425 are extracted or identified. At block 1410, OCR and/or OIR is performed on the pixels extracted or identified in block 1408. OCR may be performed without reference to a Benchmark Image 410, while OIR may be performed with reference to one or more Benchmark Images 510. Because these relatively computationally complex processes are performed only with respect to a subset of the Coin Image 425, it is possible to perform this process rapidly. To identify Search Area 415 within Coin Image 425 first requires determining the proper rotation of Coin Image 425 relative to Benchmark Image 410 (which process is discussed above). To determine a wear estimate, a number of lines or curves present in the pixels in the coin may be compared to a number of lines or curves present in the Benchmark Image 410 or an amount of contrast in the pixels relative to an amount of contrast in the Benchmark Image 410.

To the extent that the OCR/OIR output may have a confidence value, the confidence value may be obtained at block 1412 and OCR/OIR output below a confidence threshold may be rejected or flagged (and/or the confidence value may be stored in association with the Coin ID 420 record) while, at block 1414, the OCR/OIR output above the confidence threshold may be stored, for example, in Coin Attribute 530 records associated with the Coin ID 420 record. For example, the OCR/OIR output may comprise a number, such as a year, or a match with a mint-mark or a symbol.

At block 1416, the color, color uniformity, and/or contrast of all or a part of Coin Image 425 may be determined.

At block 1418, a numismatic value for the coin may be determined based on the Coin Attributes 430 determined in the preceding Blocks. The value may be obtained by looking up a price based on the Coin Attributes 430, such as in Price-Attribute Map 445 records. Price-Attribute Map 445 records may be clustered according to Human Coin Assessment 450 records associated with a Coin ID 420. Price-Attribute Map 445 records may comprise, for example, a "face" value of a coin, such as a stated currency amount, with adjustments (up or down) based on various of the Coin Attributes 430.

At block 1420, Recognizer 500 routine may return to block 1402 to iterate over the next coin, if any.

Returning to FIG. 5A, at block 518, which may be optional, the coin may be ejected from Belt 140 or Return Belt 141 into Bin 170, based on a Coin Type 407, such as to remove all of a type(s) of coin. At block 520, which may follow block 512 if computing resources were not available, coins remaining on Return Belt 141 are returned to Bulk Coin Hopper 105.

At block 522, the process returns to block 504 to iterate over the next coin in the Circuital Coin Path, if any, until all the coins in the Bulk Coin Hopper 105 have been processed. Optionally, a physical separator between the processed and the unprocessed coins may be removed when all of the coins have been processed through the first pass.

At block 524, bulk coins which have been processed through the first pass are received or are otherwise present in Bulk Coin Hopper 105, which may be the same Bulk Coin Hopper 105 in which the coins originated or a different Bulk Coin Hopper 105. Blocks 524 through 526 are performed for the set of coins in Bulk Coin Hopper 105.

At block 1300, Recognizer 500 routine performs Type Identification 1300 routine (discussed above) on each coin in the set of coins in Bulk Coin Hopper 105.

At block 526, Recognizer 500 routine may return to iterate over the next coin in the set of coins in Bulk Coin Hopper 105.

At block 528 in FIG. 5B, bulk coins which have been processed through the first pass of Recognizer 500 routine are received or are otherwise present in Bulk Coin Hopper 105.

At block 529, a belt rate for the Belts (140 and 141) during the second pass may be calculated as well as changes to other of Imager-Sorter 100 parameters, such as camera gain. A belt rate may be selected, for example, to process the coins at the fastest rate possible, in light of Recognition Criteria 405 and/or Coin Types 407 determined during execution of Type Identification 1300 subroutine during the first pass and in light of the system's knowledge of the time required to process different Recognition Criteria 405.

Blocks 530 to 554 iterate for the coins of block 528.

At block 532, a coin is detected as entering the active portion of the Circuital Coin Path, e.g. passing from Singulator 160 to Belt 140. At block 534, the coin may be imaged, such as by activation of Camera Station 125, which image may be saved as Coin Image 425. If not performed already, the coin may be assigned a Coin ID 420 which, as noted, may be Coin Image 425 or the result of a process executed on Coin Image 425. The Coin ID 420 may be matched with a previous Coin ID 420.

At block 536, Recognizer 500 routine receives Coin Image 425. At block 538, Recognizer 500 routine may locate an edge of a coin in Coin Image 425. At block 540, a central portion, such as a central diameter, of the coin in the Coin Image 425 is determined. Determination of the central diameter may be similar to the steps described in relation to block 1330a and/or may be aided by selection among central diameters of Coin Types 407 identified during the first pass of Recognizer 500 routine.

At block 542, the determined reduced set of Recognition Criteria 405 of block 526 are obtained to match Coin Image 425 to Benchmark Image 410 record according to Recognition Criteria 405. As noted elsewhere, Recognition Criteria 405 may comprise entries for pixels or measurements between pixels in a Benchmark Image 410.

Block 544 may proceed by taking the central portion of Coin Image 425 from Block 546 and match it to Recognition Criteria 405 in the small set of block 526 of block 1360, such as, for example, by overlaying Coin Image 425 pixels on Recognition Criteria 405 pixels and subtracting the values; if the result is not zero or not close to zero, then no match is determined. Alternative matching algorithms may be followed, such as algorithms which involve pixel addition or algorithms which involve determining a hash of Coin Image 425 across a matrix of pixel values which matrix has an orientation and comparing the hash value to a corresponding hash value of Recognition Criteria 405 (or of Benchmark Image 410).

If no match is determined at block 544, and if a full set of rotations has not yet been completed at block 546 (in which case, an error or a "no result" message may be returned and the coin ejected at an associated Bin 170), then at block 548, the central portion of Coin Image 425 from block 546 may be rotated (or the pixel values in the matrix are rotated), such as, for example, by one degree. The process may then return to block 544 to determine if a match is found.

Following an affirmative determination at block 544, Recognizer 500 may execute Attribute Determiner 1400 subroutine, discussed above.

At block 550, which may be optional, the coin may be ejected from Belt 140 or Return Belt 141 into Bin 170, based on Coin Attribute(s) 430 determined by the Attribute Determiner 1400 subroutine. At block 552, which may be optional, coins remaining on Return Belt 141 are returned to Bulk Coin Hopper 105.

At block 554, Recognizer 500 may return to block 530 to iterate over the next coin, if any, in the Bulk Coin Hopper 105.

At block 599, Recognizer 500 routine may conclude.

Handling Controller 600 routine and the Payment Determiner 700 routine may utilize the output of the Recognizer 500 routine. The coin may be sent to a human to be assessed, which human assessment may be saved as Human Coin Assessment 450 record.

Figure 6:
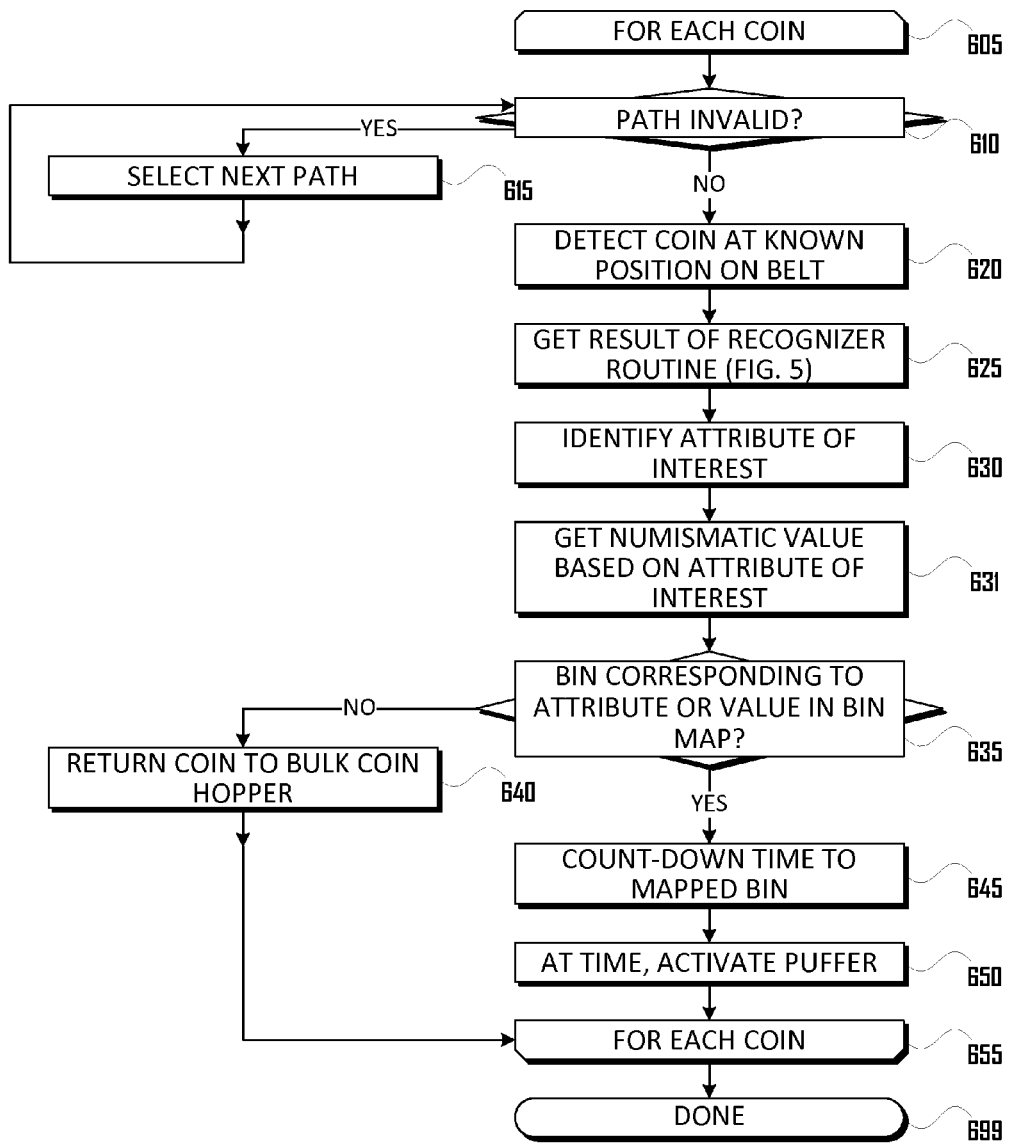
FIG. 6 is a flowchart illustrating Handling Controller 600 routine.

FIG. 6 is a flowchart illustrating Handling Controller 600 routine.

Blocks 605 to 640 iterate for attempts to put a coin into the Circuital Coin Path. At block 610, a determination is made regarding whether the Circuital Coin Path is valid, such as whether a Singulator 160 or Bulk Coin Hopper 105 has jammed or become empty, whether a Belt 140 or Camera Station 125 or 127 is inoperative. If the Path is invalid, then at block 615 the next Path may be selected, such as a next Singulator 160, which may be activated through use of Singulator Selector 167.

At block 620, Handling Controller 600 detects a coin with Coin ID 420 at a known position on Belt 140 or Return Belt 141. The speed or rotational position of Belt 140 and Return Belt 141 is or are also known.

At block 625, Handling Controller 600 may obtain the output of Recognizer 500 routine, whether the first or second pass. At block 630, Handling Controller 600 may obtain an Attribute in the output of Recognizer Routine 500 and, at block 631, may get a numismatic value for the coin based on the Attribute of block 630. The numismatic value may be obtained from, for example, Price-Attribute Map 445. At block 635, Handling Controller 600 may determine that the Attribute of block 630 or the numismatic value of block 631 is associated with a Bin 170.

At block 645, Handling Controller 600 routine may countdown the time which the coin will take to become proximate to the associated Bin 170 (from Block 620), based on the speed or position of Belt 140 or Belt 141 or based on sensors which detect the location and/or movement of coins. At block 650, the time has elapsed or the coin has otherwise become proximate to the Bin 170 and Handling Controller 600 routine activates Puffer 150 corresponding to Bin 170, to eject the coin into Bin 170.

At block 655, Handling Controller 600 returns to iterate over the next coin, if any, or concludes.

At Block 699, Handling Controller 600 routine may be done and/or may return to a starting state.

Figure 7:
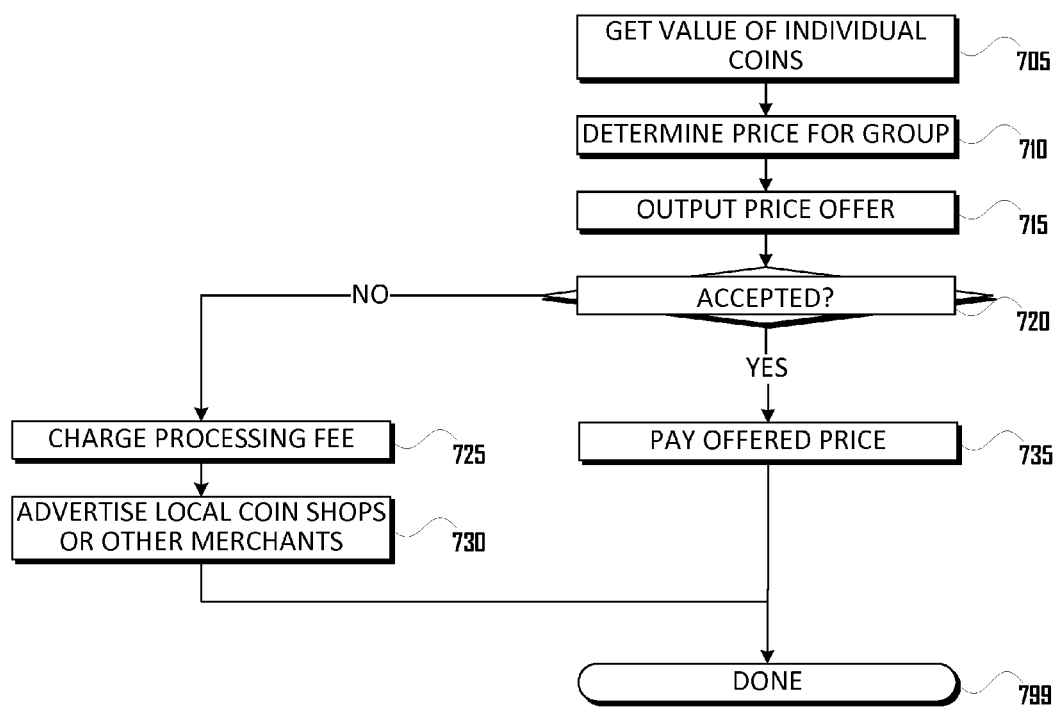
FIG. 7 is a flowchart illustrating Payment Determiner 700 routine.

FIG. 7 is a flowchart illustrating Payment Determiner 700 routine. This routine may be practiced to determine an amount to offer to pay to a customer.

At block 705, the value of individual coins in a set of bulk coins deposited in the Imager-Sorter 100 may be obtained, for example, from the Coin Value 435 records associated with Coin ID 420 records produced during processing of the customer's or a set of bulk coins.

At block 710, Coin Value 435 records from block 705 may be added and a price determined for the set of bulk coins, which price may be a percentage of the added Coin Value 435 records. The percentage may be, for example, a value dependent on market or market conditions.

At block 715, an offer may be output to communicate that the customer or a third party will be paid the price determined at block 710. The offer may be output to or through the Imager-Sorter 100, to or through the Recognizer-Controller 300, or to or through a Client Device 235. The customer may input the customer's contact information into the Imager-Sorter 100, allowing the Recognizer-Controller 300 to communicate with a Client Device 235 of the customer. Because the offered amount is based on the Coin Value 435 records, rather than just on the denominations of the coins, the offered amount may be greater than an amount which may be offered for the same set of bulk coins by coin counting apparatuses which do not practice the methods disclosed in this paper.

At block 720, a determination may be made regarding whether the offer of block 715 is accepted. If the offer is not accepted, then at block 725 a processing fee may be charged and, at block 730, advertisements for local coin shops or other merchants may be displayed, transmitted, or otherwise communicated to the customer. If the offer is accepted, then at block 735 the offered price may be paid, such as, for example, by outputting money, by outputting a check, by outputting a paper which may be redeemed at a business in which the Imager-Sorter 100 may be located, by outputting an electronic record which may be redeemed, by outputting a prepaid debit card, by crediting a bank account of the customer, by crediting a debit card of the customer, by transmitting a PayPal® or similar electronic payment to the customer, or the like.

Figure 8:
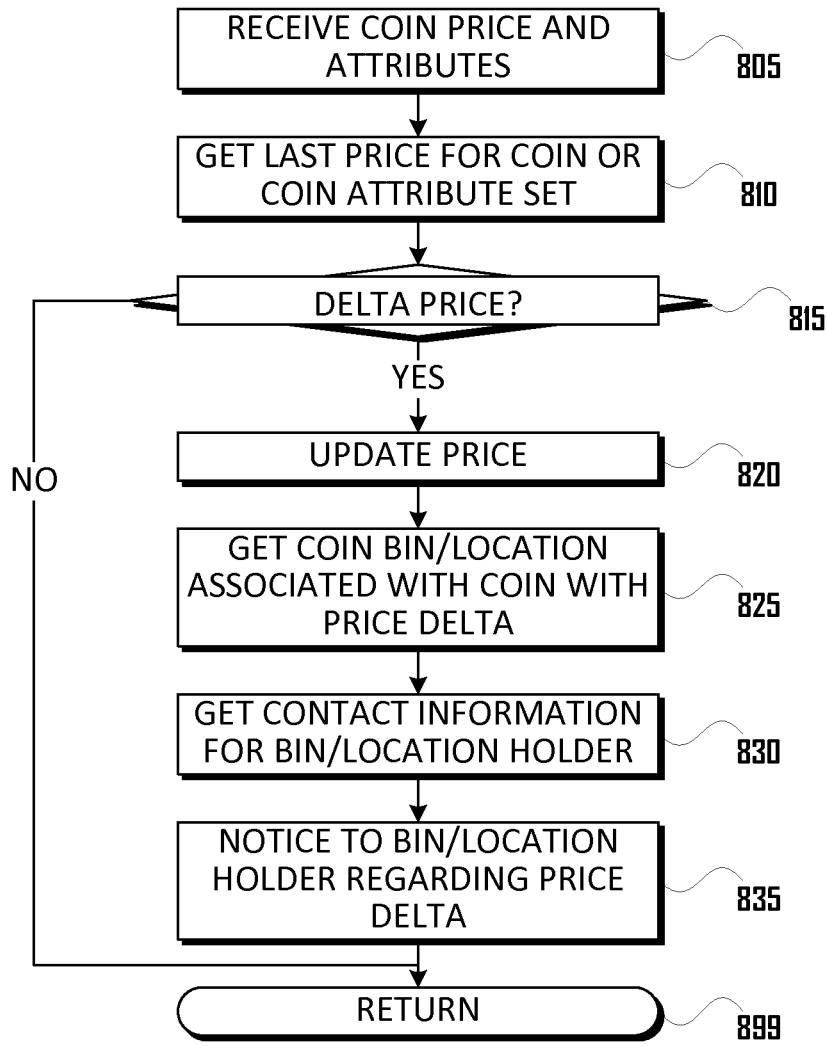
FIG. 8 is a flowchart illustrating Price Change Notifier 800 routine.

FIG. 8 is a flowchart illustrating Price Change Notifier 800 routine. This routine may notify parties when the price for a given type of coin has changed, particularly with respect to coins associated with a Bin 170.

At block 805, Price Change Notifier 800 routine receives a price for a coin and, optionally, an Attribute set associated with the price. At block 810, Price Change Notifier 800 routine obtains the last price for the coin set during execution of the Handling Controller 600 and/or Payment Determiner 700 routines and/or for coins with the Attribute set of block 805.

At block 815, a determination may be made regarding whether there has been a change ("delta") in the price due to an external change, such as in external markets or due to Human Coin Assessments 450 associated with the Coin ID 420 and/or Coin Attributes 530. If not, the process may end or return (at block 999). If so, then at block 820, the price may be updated generally, for example, in the Coin Attribute 530 records and/or with respect to specific Coin ID 420 and/or Coin Value 435 records.

At block 825, the coin Bin 170 associated with a coin (or Coin ID 420 record) which was subject to the price delta may be obtained. At block 830, the contact information for a party who may control or be associated with the Bin 170 may be obtained. At block 935, a notice to the party of block 930 may be prepared and transmitted to the party. The notice may comprise an identifier of the Bin 170, such as a code, bar code, QR code, or similar.

Figure 9:
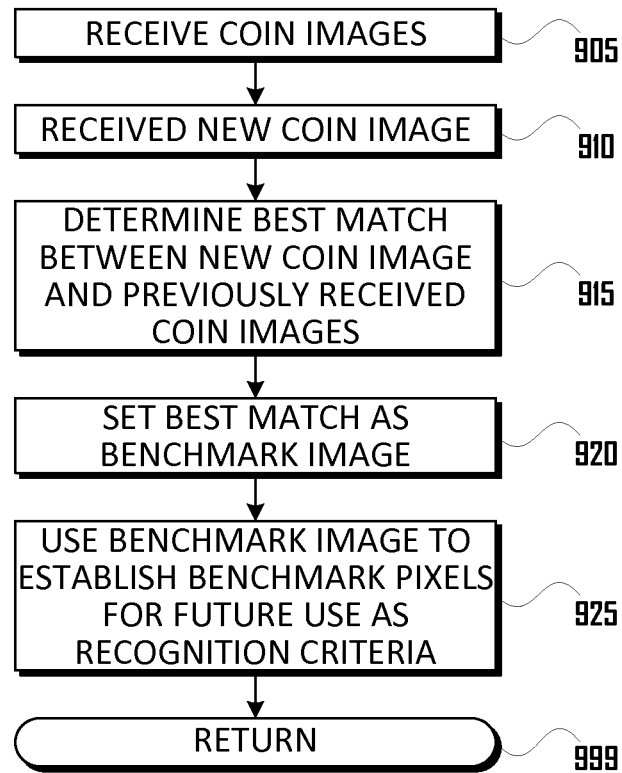
FIG. 9 is a flowchart illustrating Image Classification 900 routine.

FIG. 9 is a flowchart illustrating Image Classification 900 routine. This routine may be used to establish Benchmark Image 410.

At block 905, Image Classification 900 routine may receive Coin Image(s) 525 from one (or more) Imager-Sorter 100 apparatuses.

At block 910, Image Classification 900 routine may receive a new Coin Image 425. At block 915, a best match between the new Coin Image 425 of block 910 and Coin Images 525 of block 905 may be determined. At block 920, the best match may be set at the Benchmark Image 410. At block 925, the Benchmark Image 410 of block 920 may be used to establish benchmark pixels which may be used as Recognition Criteria 405 in the future, such as through identification of an area of interest within the Benchmark Image 410 of block 920 (which may be the same as a previously used area of interest in the prior Benchmark Image 410).

Figure 10:
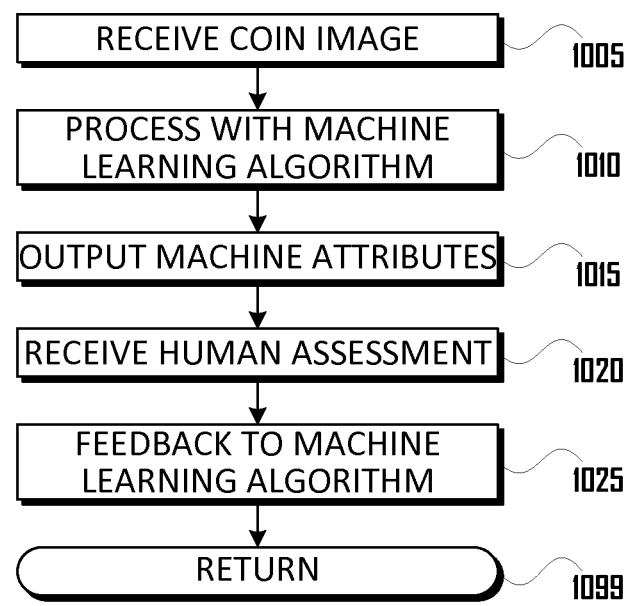
FIG. 10 is a flowchart illustrating Machine Learning 1000 routine.

FIG. 10 is a flowchart illustrating Machine Learning 1000 routine. A product of Machine Learning 1000 routine may be a subroutine of Recognizer 500, such as a subroutine to match all or part of a Coin Image 425 with Recognition Criteria 405 and/or to perform OIR or OCR on all or part of a Coin Image 425.

At block 1005, Machine Learning 1000 routine receives a Coin Image 425. At block 1010, Machine Learning 1000 routine executes a machine learning process on the received Coin Image 425. The machine learning process may be a supervised process involving statistical classification or an unsupervised learning process involving an artificial neural network, association rule learning, hierarchical clustering, cluster analysis, and/or outlier detection. The machine learning process may involve reinforcement learning.

At block 1015, Machine Learning 1000 routine outputs Coin Attributes 430 for the coin according to the learning process of block 1010.

At block 1020, Machine Learning 1000 routine may receive a human assessment and/or human assigned coin attributes for the coin, such as Human Coin Assessment 450. At block 1025, Machine Learning 1000 routine may provide feedback to the machine learning process of block 1010, in the form of Human Coin Assessment 450 of block 1020. The feedback may reinforce determinations by Machine Learning 1000 routine which were correlated with Human Coin Assessment 450.

At block 1099, Machine Learning 1000 routine may return to iterate over the next coin, if any, or may conclude.

FIG. 11 is a diagram of electrical and communication paths among components of Recognizer-Controller 300. In FIG. 11, Singulator 1101 is generally equivalent to Singulator 160. Singulator Selector 1105 generally comprises Singulator Selector 167 and Actuator 168. Coin Path 1107 generally comprises Belt 140 and Return Belt 141. Coin Detector 1110 generally comprises one or more sensors (optical, mass, magnetic, electrical, physical contact or the like) to detect the presence of a coin on the Coin Path 1107. Camera and Light 1115 generally comprises the components of Camera Station 125 or 127. Coin-Position Determiner 1120 generally comprises motors, belt speed, belt position determining sensors, and computer processes required to determine the position of a coin on the Coin Path 1107, generally relative to a position of a coin detected by Coin Detector 1110. Coin Ejector 1125 generally comprises Puffer 150.

Additionally, images of unknown or unidentifiable coins may be posted to a social network, such as according to Attributes (such as color) or a broader Coin Type 407, with an invitation to the public to post or submit images of coins which the submitting party believes to correspond to the unknown coin image. Machine optical recognition may then be used to characterize the Attributes of the coins and to generate a similarity measurement for the coins.

Additionally, if a first person believes that a second person, without authorization, has alienated coins belonging to the first or a third person, the first person may request that Coin Image 425 records and Coin Attribute 430 records be searched for images or attributes corresponding to the alienated coins. Because the disclosed Imager-Sorter 100 and Recognizer-Controller 300 are able to process a very large number of coins and retain images of the coins, such searches may return corresponding coin information, including ranked patterns of coin types which may correspond to coin types believed to have been present in the alienated coins and including pictures of the coins, in addition to a bin into which the coin was binned, in addition to contact information for the bin.

The above Detailed Description of embodiments is not intended to be exhaustive or to limit the disclosure to the precise form disclosed above. While specific embodiments of, and examples are described above for illustrative purposes, various equivalent modifications are possible within the scope of the system, as those skilled in the art will recognize. For example, while processes or blocks are presented in a given order, alternative embodiments may perform routines having operations, or employ systems having blocks, in a different order, and some processes or blocks may be deleted, moved, added, subdivided, combined, and/or modified.

While processes or blocks are at times shown as being performed in series, these processes or blocks may instead be performed in parallel, or may be performed at different times. Further, any specific numbers noted herein are only examples; alternative implementations may employ differing values or ranges.

The invention claimed is:

1. A coin recognition method executed on a computer comprising a memory, comprising the following:
   in a first pass,
   receiving a group of bulk coins in a first bulk coin receptacle in a coin handling machine controlled by the computer;
   by the computer, processing the group of bulk coins with the coin handling machine and utilizing a first set of recognition criteria to determine a first set of coin attributes present in the group of bulk coins and returning at least a subset of the group of bulk coins to the first bulk coin receptacle;
   by the computer, selecting a second set of recognition criteria according to the determined first set of coin attributes; and
   in a second pass,
   by the computer, processing the subset of the group of bulk coins in the first bulk coin receptacle with the coin handling machine and utilizing the second set of recognition criteria to determine an additional attribute of a coin in the subset of the group of bulk coins, wherein the additional attribute is not in the first set of coin attributes.

2. The method according to claim 1, wherein processing the group of bulk coins by the coin handling machine to determine the first set of coin attributes present in the group of bulk coins comprises, for a coin in the group of bulk coins, photographically imaging the coin in a bright field, determining a coin edge in a photographic image, locating a center of the coin in the photographic image, and matching a set of pixels in the photographic image to a set of benchmark pixels.

3. The method according to claim 2, further comprising determining the first set of coin attributes present in the group of bulk coins utilizing the first set of recognition criteria only after all of the group of bulk coins have been returned to the bulk coin receptacle.

4. The method according to claim 1, wherein processing the group of bulk coins by the coin handling machine to determine the first set of coin attributes present in the group of bulk coins comprises, for a coin in the group of bulk coins, photographically imaging the coin in a bright field, and matching pixels in a photographic image to a template-independent criteria and identifying a coin attribute corresponding to the template-independent criteria.

5. The method according to claim 1, wherein utilizing the second set of recognition criteria to determine the additional attribute of the coin in the subset of the group of bulk coins comprises, for the coin in the group of bulk coins, photographically imaging the coin in a bright field, determining a coin edge in a photographic image, locating a center of the coin in the photographic image, matching a set of pixels in the photographic image to a first recognition criteria selected from the second set of recognition criteria, and utilizing the first recognition criteria, performing computer-based recognition on pixels in the photographic image to determine the additional attribute.

6. The method of claim 5, wherein locating a center of the coin in the photographic image comprises locating a center according to median values of estimators of horizontal and vertical coin center coordinate components, equal to bisectors of vertical and horizontal lines whose endpoints coincide with coin edges as determined by local extremization of pixel intensity step functions.

7. The method of claim 5, wherein locating a center of the coin in the photographic image comprises locating a center according to the second set of recognition criteria.

8. The method of claim 5, wherein performing computer-based recognition on pixels in the photographic image to determine the additional attribute for the coin in the subset of the group of bulk coins comprises performing optical recognition on pixels in the photographic image.

9. The method of claim 8 wherein optical recognition comprises optical image recognition which is performed relative to a set of benchmark pixels.

10. The method according to claim 1, wherein utilizing the second set of recognition criteria to determine the additional attribute of the coin in the subset of the group of bulk coins comprises photographically imaging the coin in a bright field, and matching pixels in a photographic image to template-independent criteria and to determine the additional attribute.

11. The method according to claim 1, further comprising, during the first pass and before all of the group of bulk coins have been returned to the bulk coin receptacle, determining that the computer has computing resources available to determine at least a portion of the first set of coin attributes present in the group of bulk coins utilizing the first set of recognition criteria.

12. The method according to claim 11, while a first coin in the group of bulk coins is in a coin path of the coin handling machine, activating a coin ejector to remove the first coin from the coin path based on a first coin attribute in the first set of coin attributes.

13. The method according to claim 11, while a first coin in the group of bulk coins is in a coin path of the coin handling machine, determining that the computer has computing resources available to utilize the second set of recognition criteria to determine an additional attribute of the first coin based on the second set of recognition criteria, and activating a coin ejector to remove the first coin from the coin path based on said additional attribute.

14. The method according to claim 1, further comprising determining a numismatic value of the coin in the subset of the group of bulk coins based at least in part on the determined additional attribute.

15. The method according to claim 14, wherein the subset of the group of bulk coins is the group of bulk coins and further comprising determining a total value for the group of bulk coins based on the determined numismatic value of the coin in the subset of the group of bulk coins and outputting an offer to purchase the group of bulk coins, wherein the offer comprises an amount based on the determined total value.

16. The method according to claim 14, wherein the numismatic value is determined based on a table mapping attributes to values or value factors.

17. The method according to claim 14, further comprising determining that the numismatic value of the coin has changed, identifying contact information associated with the coin, and sending notice to the contact information that the numismatic value of the coin has changed.

18. The method according to claim 1, wherein the coin handling machine further comprises a circuital coin path, a coin-position determiner, a coin ejector, and a coin receptacle, and wherein the method comprises, by the computer acting on the coin ejector, ejecting the coin in the subset of the group of bulk coins into the receptacle based on the determined additional attribute.

19. The method according to claim 18, wherein the circuital coin path returns to the bulk coin receptacle.

20. The method according to claim 18, wherein the circuital coin path comprises at least one belt.

21. The method according to claim 20, wherein the belt is a color not generally present in coins.

22. The method according to claim 1, wherein the coin handling machine comprises a lighting and imaging station comprising a camera and a diffuse coaxial light source.

23. The method according to claim 22, further comprising sending an image of the coin in the subset of the group of bulk coins to be assessed by a human.

24. The method according to claim 23, wherein determining attribute values for coins comprises utilizing a computer-learning method and further comprising receiving the human assessment and providing feedback to the computer-learning method based on the human assessment.

25. The method according to claim 1, wherein the first set of coin attributes and the additional attribute comprise at least one of a type, a strike, a surface preservation, a luster, a mint mark, a date, a legend, a device, a dentil, a field, an edge, a rim, a motto, a denomination, a director's edge mark, an engraver's mark, an exergue, a material, a color, a finish, a die mark, an error, a planchet flaw, a die variety, and a wear estimate.

26. The method according to claim 25, wherein the wear estimate is determine based at least in part on a number of curves identifiable in or an amount of contrast in an area of interest.

27. The method according to claim 1, wherein the first set of coin attributes comprises a type of coin.

28. A coin handling apparatus for identification of bulk coins,
which apparatus comprises:
a bulk coin receptacle for holding bulk coins;
a first circuital coin path comprising a first coin singulator and a second circuital coin path comprising a second coin singulator, wherein, when active, the coin singulators deposit coins in the respective first or second circuital coin path;
a coin-position determiner;
a coin ejector for ejecting coins from the first or second circuital coin path into a coin bin; and
a computer for performing machine recognition of coins in the first or second coin path and for controlling the coin handling apparatus; wherein performing machine recognition comprises:
utilizing a first set of recognition criteria to determine a first set of coin attributes present in a group of bulk coins and returning at least a subset of the group of bulk coins to the bulk coin receptacle;
selecting a second set of recognition criteria according to the first set of coin attributes;
utilizing the second set of recognition criteria to determine an additional attribute of a coin in the subset of the group of bulk coins, wherein the additional attribute is not in the first set of coin attributes.

29. The apparatus according to claim 28, further comprising a circuital coin path selector for selecting a valid circuital coin path.

30. The apparatus according to claim 29 wherein a circuital coin path may be invalid if the coin singulator in the circuital coin path is not functional.

31. A coin recognition method executed on a computer comprising a memory, which method comprises the following steps:
with respect to a group of images of coins in a set of bulk coins;

utilizing a first set of recognition criteria and optical recognition to determine a first set of coin attributes present in the group of images of coins in the set of bulk coins and, utilizing an identifier assigned to each image in the group of images of coins in the set of bulk coins, causing at least a subset of the group of images of coins in the set of bulk coins to be distinguished from the group of images of coins in the set of bulk coins;

selecting a second set of recognition criteria according to the determined first set of coin attributes; and processing at least the subset of the group of images of coins in the set of bulk coins with the second set of recognition criteria to determine an additional attribute of a coin in the subset of the group of images of coins in the set of bulk coins, wherein the additional attribute is not in the first set of coin attributes.

* * * * *